US010943409B2

(12) United States Patent
Ishihara et al.

(10) Patent No.: US 10,943,409 B2
(45) Date of Patent: Mar. 9, 2021

(54) INFORMATION PROCESSING APPARATUS, INFORMATION PROCESSING METHOD, AND PROGRAM FOR CORRECTING DISPLAY INFORMATION DRAWN IN A PLURALITY OF BUFFERS

(71) Applicant: SONY CORPORATION, Tokyo (JP)

(72) Inventors: Atsushi Ishihara, Kanagawa (JP); Hiroyuki Aga, Tokyo (JP); Koichi Kawasaki, Tokyo (JP); Mitsuru Nishibe, Chiba (JP)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 16/086,924

(22) PCT Filed: Mar. 8, 2017

(86) PCT No.: PCT/JP2017/009261
§ 371 (c)(1),
(2) Date: Sep. 20, 2018

(87) PCT Pub. No.: WO2017/183346
PCT Pub. Date: Oct. 26, 2017

(65) Prior Publication Data
US 2019/0102956 A1 Apr. 4, 2019

(30) Foreign Application Priority Data

Apr. 18, 2016 (JP) .............................. JP2016-082983

(51) Int. Cl.
G06T 19/20 (2011.01)
G06T 19/00 (2011.01)
G06F 3/01 (2006.01)
G06F 3/14 (2006.01)
G06K 9/00 (2006.01)
G06T 15/20 (2011.01)

(52) U.S. Cl.
CPC .............. *G06T 19/20* (2013.01); *G06F 3/011* (2013.01); *G06F 3/14* (2013.01); *G06K 9/00201* (2013.01);
(Continued)

(58) Field of Classification Search
None
See application file for complete search history.

(56) References Cited

U.S. PATENT DOCUMENTS 9,595,083 B1 * 3/2017 Smith ...................... G06F 3/012
10,553,017 B2 * 2/2020 Yeoh ...................... G06T 19/003
(Continued)

FOREIGN PATENT DOCUMENTS

JP 2010-004176 A 1/2010
JP 2010-092436 A 4/2010
(Continued)

OTHER PUBLICATIONS

May 12, 2020, Japanese Office Action issued for related JP application No. 2018-513058.
(Continued)

Primary Examiner — Hilina K Demeter
(74) Attorney, Agent, or Firm — Paratus Law Group, PLLC

(57) ABSTRACT

There is provided an information processing apparatus to correct the display of a virtual object in a more favorable mode under conditions in which the virtual object is superimposed onto a real space. The information processing apparatus includes: an acquisition unit that acquires information related to a result of recognizing a real object in a real space; a drawing unit that draws, in each of a plurality of buffers, display information directly or indirectly associated with the buffer from among a plurality of pieces of display information; and a display control unit that corrects a display
(Continued)

of the display information drawn in each of the plurality of buffers on a basis of the result of recognizing the real object, and causes a predetermined output unit to present each piece of the display information whose display has been corrected according to a positional relationship with the real object.

20 Claims, 14 Drawing Sheets

(52) U.S. Cl.
CPC .............. *G06T 15/20* (2013.01); *G06T 19/00* (2013.01); *G06T 19/006* (2013.01)

(56) References Cited

U.S. PATENT DOCUMENTS

| | | | | |
|---|---|---|---|---|
| 2009/0315887 | A1* | 12/2009 | Yamaguchi | H04N 9/3185 345/428 |
| 2010/0091096 | A1* | 4/2010 | Oikawa | G09G 5/377 348/53 |
| 2012/0162204 | A1* | 6/2012 | Vesely | G06F 3/0325 345/419 |
| 2015/0379772 | A1* | 12/2015 | Hoffman | G06T 19/006 345/633 |
| 2016/0110919 | A1* | 4/2016 | Hancock | G06T 15/005 345/428 |
| 2016/0320863 | A1* | 11/2016 | Shimoda | G06F 3/0304 |
| 2017/0374341 | A1* | 12/2017 | Michail | G06T 15/06 |

FOREIGN PATENT DOCUMENTS

| | | |
|---|---|---|
| JP | 2013-235373 A | 11/2013 |
| KR | 10-2011-0136035 A | 12/2011 |

OTHER PUBLICATIONS

Yuusuke Kikkawa et al., Illusion Expression on Augmented Reality by Combining Image Buffers, IPSJ Interaction 2012, Mar. 17, 2012, pp. 1-10, Japan.

\* cited by examiner

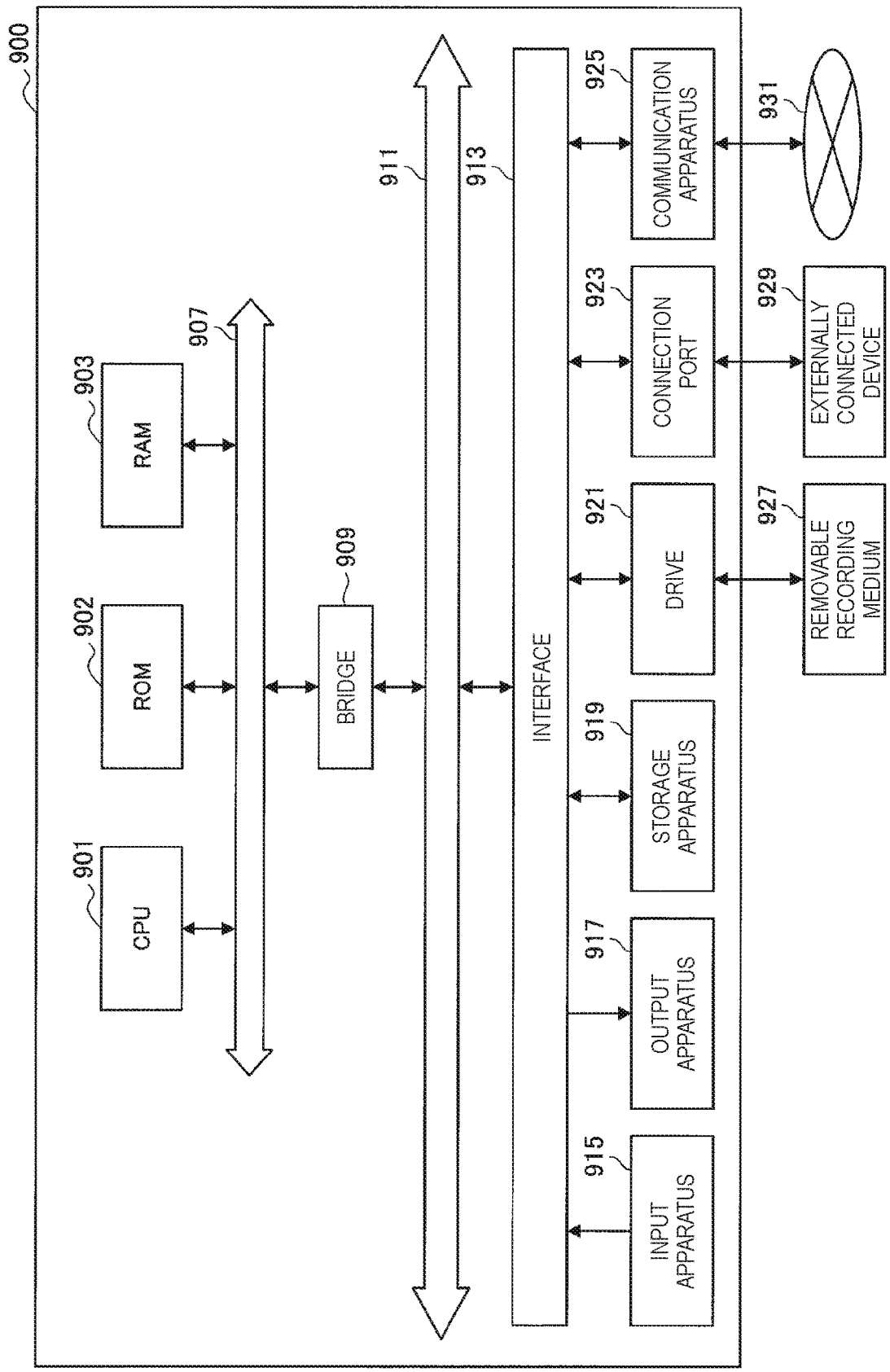

INFORMATION PROCESSING APPARATUS, INFORMATION PROCESSING METHOD, AND PROGRAM FOR CORRECTING DISPLAY INFORMATION DRAWN IN A PLURALITY OF BUFFERS

CROSS REFERENCE TO PRIOR APPLICATION

This application is a National Stage Patent Application of PCT International Patent Application No. PCT/JP2017/009261 (filed on Mar. 8, 2017) under 35 U.S.C. § 371, which claims priority to Japanese Patent Application No. 2016-082983 (filed on Apr. 18, 2016), which are all hereby incorporated by reference in their entirety.

TECHNICAL FIELD

The present disclosure relates to an information processing apparatus, an information processing method, and a program.

BACKGROUND ART

Recently, as image recognition technology has become more advanced, it has become possible to recognize the position and attitude of a real object (that is, a physical object in a real space) included in an image captured by an imaging apparatus. The technology called augmented reality (AR) is known as one applied example of such physical object recognition. By utilizing AR technology, it becomes possible to present, to a user, virtual content thereinafter also designated a "virtual object") in various modes such as text, icons, or animations, superimposed onto a real object captured in an image of a real space. For example, Patent Literature 1 discloses one example of AR technology.

CITATION LIST

Patent Literature

Patent Literature 1: JP 2013-92964A

DISCLOSURE OF INVENTION

Technical Problem

Meanwhile, depending on the display information to present as the virtual object, the processing load of drawing the virtual object becomes comparatively high, and in some cases, a delay occurs from when the drawing of the virtual object is started until the virtual object is output as display information. For this reason, for example, in association with this delay, if a change occurs in the position of a viewpoint of a user before the drawn virtual object is presented to the user, a misalignment occurs in the relative positional relationship between the position of the viewpoint and the position where the drawn virtual object is superimposed. In some cases, for example, such misalignment is recognized by the user as a misalignment of the position in the space where the virtual object is superimposed. The same applies not only to AR, but also to what is called virtual reality (VR), which presents a virtual object in an artificially constructed virtual space.

In contrast, with VR, for example, by accounting for the delay associated with the drawing of the virtual object and correcting the display position, in the virtual space, of the virtual object after the drawing, the impact of the delay associated with drawing is reduced in some cases. On the other hand, since AR has the characteristic of superimposing a virtual object onto a real space, in the case of simply correcting the display position of the virtual object, a misalignment occurs between the optical image of the real space seen by the user and the display of the virtual object in some cases.

Accordingly, the present disclosure proposes an information processing apparatus, an information processing method, and a program capable of correcting the display of a virtual object in a more favorable mode under conditions in which the virtual object is superimposed onto a real space.

Solution to Problem

According to the present disclosure, there is provided an information processing apparatus including: an acquisition unit that acquires information related to a result of recognizing a real object in a real space; a drawing unit that draws, in each of a plurality of buffers, display information directly or indirectly associated with the buffer from among a plurality of pieces of display information; and a display control unit that corrects a display of the display information drawn in each of the plurality of buffers on a basis of the result of recognizing the real object, and causes a predetermined output unit to present each piece of the display information whose display has been corrected according to a positional relationship with the real object.

In addition, according to the present disclosure, there is provided an information processing method including, by a computer system: acquiring information related to a result of recognizing a real object in a real space; drawing, in each of a plurality of buffers, display information directly or indirectly associated with the buffer from among a plurality of pieces of display information; and correcting a display of the display information drawn in each of the plurality of buffers on a basis of the result of recognizing the real object, and causing a predetermined output unit to present each piece of the display information whose display has been corrected according to a positional relationship with the real object.

In addition, according to the present disclosure, there is provided a program causing a computer system to execute: acquiring information related to a result of recognizing a real object in a real space; drawing, in each of a plurality of buffers, display information directly or indirectly associated with the buffer from among a plurality of pieces of display information; and correcting a display of the display information drawn in each of the plurality of buffers on a basis of the result of recognizing the real object, and causing a predetermined output unit to present each piece of the display information whose display has been corrected according to a positional relationship with the real object.

Advantageous Effects of Invention

According to the present disclosure as described above, there is provided an information processing apparatus, an information processing method, and a program capable of correcting the display of a virtual object in a more favorable mode under conditions in which the virtual object is superimposed onto a real space.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 15 is a function block diagram illustrating one exemplary configuration of a hardware configuration.

MODE(S) FOR CARRYING OUT THE INVENTION

Figure 1:
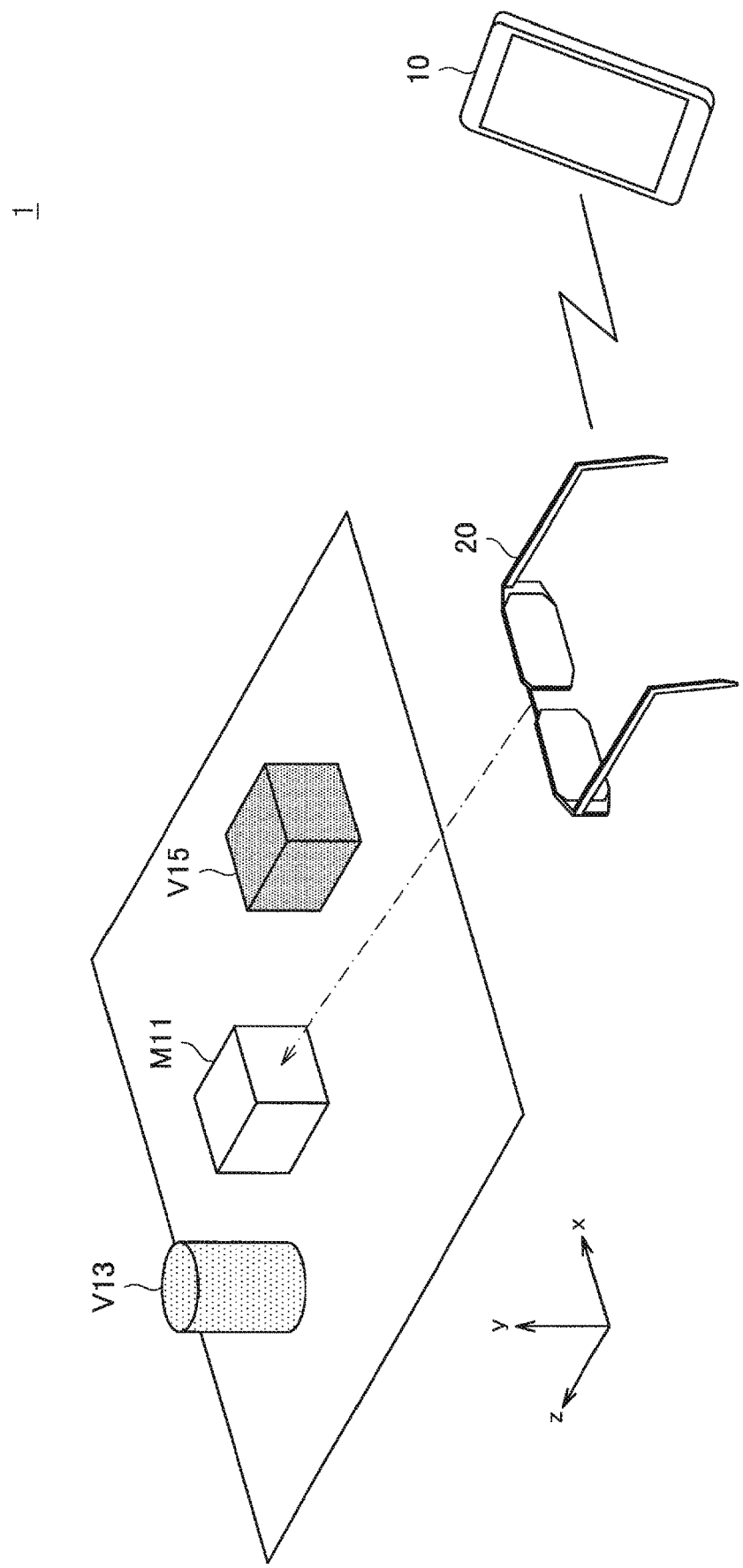
FIG. 1 is an explanatory diagram for explaining an example of a schematic configuration of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.
1. Overview
 1.1. Schematic configuration
 1.2. Configuration of input/output apparatus
 1.3. Principle of localization
 2. Investigation regarding delay associated with drawing of virtual object
 3. Technical features
  3.1. Basic principle
  3.2. Functional configuration
  3.3. Processes
 4. Modifications
  4.1. Modification 1: Example of association between virtual object and buffer
  4.2. Modification 2: Example of region division
  4.3. Modification 3: Buffer control examples
  4.4. Modification 4: Example of control related to drawing and output of virtual objects
  4.5. Modification 5: Example of interaction control
 5. Hardware configuration
 6. Conclusion <<1. Overview>>

<1.1. Schematic Configuration>

First, an example of a schematic configuration of an information processing apparatus according to an embodiment of the present disclosure will be described with reference to FIG. 1. FIG. 1 is an explanatory diagram for explaining an example of a schematic configuration of the information processing system according to an embodiment of the present disclosure. In FIG. 1, the reference sign M11 schematically illustrates an object (that is, a real object) positioned in a real space. Also, the reference signs V13 and V15 schematically illustrate virtual content (that is, virtual objects) presented superimposed onto the real space. In other words, the information processing system 1 according to the present embodiment, on the basis of what is called AR technology, presents virtual objects superimposed with respect to an object in the real space, such as the real object M11, for example, to the user. Note that in FIG. 1, to make the features of the information processing system according to the present embodiment easier to understand, both a real object and virtual objects are presented together.

As illustrated in FIG. 1, the information processing system 1 according to the present embodiment includes an information processing apparatus 10 and an input/output apparatus 20. The information processing apparatus 10 and the input/output apparatus 20 are configured to be able to transmit and receive information with each other over a predetermined network. Note that the type of network that connects the information processing apparatus 10 and the input/output apparatus 20 is not particularly limited. As a specific example, the network may be configured as what is called a wireless network, such as a network based on the Wi-Fi (registered trademark) standard. Also, as another example, the network may be configured as the Internet, a dedicated line, a local area network (LAN), a wide area network (WAN), or the like. In addition, the network may also include multiple networks, and may also be configured as a partially wired network.

The input/output apparatus 20 is a configuration for acquiring various input information, and presenting various output information to a user carrying the input/output apparatus 20. Also, the presentation of output information by the input/output apparatus 20 is controlled by the information processing apparatus 10, on the basis of input information acquired by the input/output apparatus 20. For example, the input/output apparatus 20 acquires information for identifying the real object M11 as input information, and outputs the acquired information to the information processing apparatus 10. On the basis of the information acquired from the input/output apparatus 20, the information processing apparatus 10 recognizes the position of the real object M11 in a real space, and on the basis of the recognition result, causes the input/output apparatus 20 to present the virtual objects V13 and V15. By such control, on the basis of what is called AR technology, the input/output apparatus 20 becomes able to present the virtual objects V13 and V15 to the user such that the virtual objects V13 and V15 are superimposed with respect to the real object M11. Note that in FIG. 1, the input/output apparatus 20 and the information processing apparatus 10 are illustrated as different apparatus from each other, but the input/output apparatus 20 and the information processing apparatus 10 may also be configured in an integrated manner. Also, the details of the configurations and processes of the input/output apparatus 20 and the information processing apparatus 10 will be described separately later.

As above, FIG. 1 is referenced to describe an example of the schematic configuration of the information processing apparatus according to an embodiment of the present disclosure.

<1.2. Configuration of Input/Output Apparatus>

Figure 2:
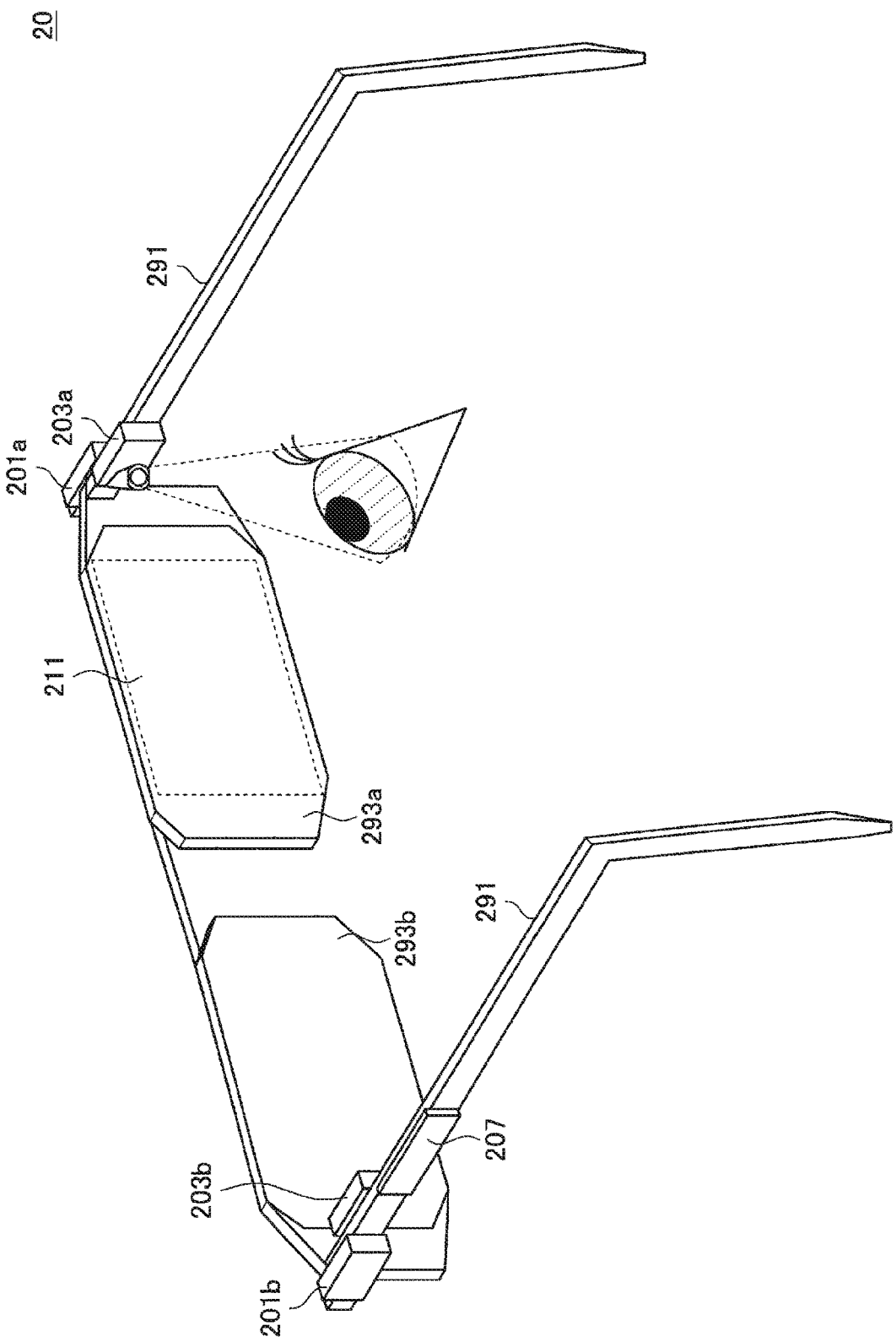
FIG. 2 is an explanatory diagram for explaining an example of a schematic configuration of an input/output apparatus according to an embodiment of the present disclosure.

Next, an example of a schematic configuration of an input/output apparatus 20 illustrated in FIG. 1 according to an embodiment of the present disclosure will be described with reference to FIG. 2. FIG. 2 is an explanatory diagram for explaining an example of a schematic configuration of the input/output apparatus according to the present embodiment.

The input/output apparatus 20 is configured as what is called a head-mounted device, which is used by being worn on at least part of a user's head. For example, in the example illustrated in FIG. 1, the input/output apparatus 20 is configured as what is called an eyewear (glasses-style) device, in which at least one of lenses 293a and 293b is configured as a transmissive display (output unit 211). Also, the input/output apparatus 20 is provided first imaging units 201a and 201b, second imaging units 203a and 203b, an operating unit 207, and a holding unit 291 that corresponds to the frames of the glasses. When the input/output apparatus 20 is worn on the user's head, the holding unit 291 holds the output unit 211, the first imaging units 201a and 201b, the second imaging units 203a and 203b, and the operating unit 207 in a predetermined positional relationship with respect to the user's head. Additionally, although not illustrated in FIG. 1, the input/output apparatus 20 may also be provided with a sound collection unit for collecting the user's voice.

Herein, a more specific configuration of the input/output apparatus 20 will be described. For example, in the example illustrated in FIG. 1, the lens 293a corresponds to the lens on the right-eye side, while the lens 293b corresponds to the lens on the left-eye side. In other words, in the case in which the input/output apparatus 20 is worn, the holding unit 291 holds the output unit 211 such that the output unit 211 is positioned in front of the user's eyes.

The first imaging units 201a and 201b are configured as what is called a stereo camera, with each being held by the holding unit 291 to point in the direction that the uses head is facing (that is, the forward direction of the user) when the input/output apparatus 20 is worn on the user's head. At this time, the first imaging unit 201a is held near the user's right eye, while the first imaging unit 201b is held near the user's left-eye. On the basis of such a configuration, the first imaging units 201a and 201b capture a subject (in other words, a real object positioned in a real space) positioned in front of the input/output apparatus 20 from mutually different positions. With this arrangement, the input/output apparatus 20 becomes able to acquire images of the subject positioned in front of the user, and in addition, on the basis of the parallax between the images captured by each of the first imaging units 201a and 201b, compute the distance from the input/output apparatus 20 to the subject.

Note that the configuration and method are not particularly limited, insofar as the distance between the input/output apparatus 20 and the subject is measurable. As a specific example, the distance between the input/output apparatus 20 and the subject may be measured on the basis of methods such as multi-camera stereo, motion parallax, time-of-flight (TOF), and structured light. Herein, TOF refers to a method of projecting light such as infrared rays onto the subject and measuring, for each pixel, the time for the contributed light to be reflected by the subject and return, and thereby obtaining an image (also called a depth map) including the distance (depth) to the subject on the basis of the measurement results. Also, structured light is a method of irradiating the subject with a pattern by light such as infrared rays and capturing an image, and on the basis of changes in the pattern obtained from the imaging result, obtaining a depth map including the distance (depth) to the subject. Also, motion parallax refers to a method of measuring the distance to the subject on the basis of parallax, even with what is called a monocular camera. Specifically, by moving the camera, the subject is captured from mutually different viewpoints, and the distance to the subject is measured on the basis of the parallax between the captured images. Note that by recognizing the motion distance and motion direction of the camera with various sensors at this time, it is possible to measure the distance to the subject more precisely. Note that the configuration of the imaging unit (such as a monocular camera or stereo camera, for example) may be changed in accordance with the distance measuring method.

In addition, each of the second imaging units 203a and 203b is held by the holding unit 291 so an eyeball of the user is positioned inside the imaging range of each when the input/output apparatus 20 is worn on the user's head. As a specific example, the second imaging unit 203a is held such that the user's right eye is positioned inside the imaging range. On the basis of such a configuration, it becomes possible to recognize the direction in which the line of sight of the right eye is pointing, on the basis of the image of the eyeball of the right eye captured by the second imaging unit 203a, and the positional relationship between the second imaging unit 203a and the right eye. Similarly, the second imaging unit 203b is held such that the user's left eye is positioned inside the imaging range. In other words, it becomes possible to recognize the direction in which the line of sight of the left eye is pointing, on the basis of the image of the eyeball of the left eye captured by the second imaging unit 203b, and the positional relationship between the second imaging unit 203b and the left eye. Also, although the example illustrated in FIG. 2 illustrates a configuration in which the input/output apparatus 20 includes both second imaging units 203a and 203b, it is also possible to provide only one of the second imaging units 203a and 203b.

The operating unit 207 is a configuration for receiving operations from the user with respect to the input/output apparatus 20. For example, the operating unit 207 may be configured by an input device like a touch panel, a button, or the like. The operating unit 207 is held by the holding unit 291 at a predetermined position on the input/output apparatus 20. For example, in the example illustrated in FIG. 2, the operating unit 207 is held at a position corresponding to a temple of the glasses.

In addition, the input/output apparatus 20 according to the present embodiment may also be provided with an acceleration sensor and an angular velocity sensor (gyro sensor), for example, and be configured to be able to detect the motion of the head of the user wearing the input/output apparatus 20 (in other words, the motion of the input/output apparatus 20 itself). As a specific example, the input/output apparatus 20 may detect the component in each of the yaw direction, pitch direction, and roll direction as the motion of the user's head, and thereby recognize a change in at least of the position and the attitude of the user's head.

On the basis of a configuration like the above, the input/output apparatus 20 according to the present embodiment becomes able to recognize changes in the position and attitude of itself in the real space corresponding to the motion of the user's head. Additionally, the input/output apparatus 20 also becomes able to present content on the output unit 211 on the basis of what is called AR technology, such that virtual content (that is, a virtual object) is superimposed onto a real object positioned in the real space. Note that an example of a method by which the input/output apparatus 20 estimates the position and the attitude of itself (that is, localization) will be described separately in detail.

Note that examples of the head-mounted display (HMD) applicable as the input/output apparatus 20 include a see-through HMD, a video see-through HMD, and a retinal projection HMD, for example.

A see-through HMD, for example, uses a half mirror and a transparent light guide plate to hold a virtual image optical system including a transparent light guide unit and the like in front of the user's eyes, and display an image on the inner side of the virtual image optical system. For this reason, for the user wearing the see-through HMD, it is possible for the outside scene to enter into one's field of view, even while viewing the image displayed on the inner side of the virtual image optical system. According to such a configuration, on the basis of AR technology, for example, the see-through HMD is capable of superimposing an image of the virtual object onto an optical image of the real object positioned in the real space, in accordance with a recognition result of at least one of the position and the attitude of the see-through HMD. Note that specific examples of the see-through HMD include what is called a glasses-style wearable device, in which the part corresponding to the lenses of a pair of glasses are configured as the virtual image optical system. For example, the input/output apparatus 20 illustrated in FIG. 2 corresponds to an example of a see-through MID.

In the case in which a video see-through HMD is worn on the user's head or face, the video see-through HMD is worn to cover the user's eyes, and a display unit such as a display is held in front of the user's eyes. Further, the video see-through HMD includes an imaging unit for imaging the surrounding scene, and causes the display unit to display an image of the scene in front of the user imaged by the imaging unit. With such a configuration, for the user wearing the video see-through HMD, it is difficult for the outside scene to enter into one's field of view directly, but it becomes possible to check the outside scene by an image displayed on the display unit. In addition, on the basis of AR technology, for example, the video see-through HMD at this time may also superimpose a virtual object onto an image of the external scenery, in accordance with a recognition result of at least one of the position and the attitude of the video see-through HMD.

With a retinal projection HMD, a projection unit is held in front of the user's eyes, and an image is projected from the projection unit towards the user's eyes so that the image is superimposed onto the outside scene. More specifically, in a retinal projection HMD, an image is projected directly from the projection unit onto the retina of the user's eyes, and the image is formed on the retina. With such a configuration, the viewing of a clearer picture becomes possible, even in the case of a near-sighted or a far-sighted user. Also, for the user wearing the retinal projection HMD, it becomes possible for the outside scene to enter into one's field of view, even while viewing the image projected from the projection unit. According to such a configuration, on the basis of AR technology, for example, the retinal projection HMD is capable of superimposing an image of the virtual object onto an optical image of the real object positioned in the real space, in accordance with a recognition result of at least one of the position and the attitude of the retinal projection HMD.

Note that for reference, besides the examples described above, an HMD called an immersive HMD is also possible. The immersive HMD is worn to cover the user's eyes, similarly to the video see-through HMD, and a display unit such as a display is held in front of the user's eyes. For this reason, for the user wearing the immersive HMD, it is difficult for the outside scene (that is, the scene of the real world) to enter into one's field of view directly, and only the picture displayed on the display unit enters one's field of view. With such a configuration, the immersive HMD is capable of imparting a sense of immersion to the user viewing an image.

The above describes an example of the schematic configuration of the input/output apparatus according to the embodiment of the present disclosure with reference to FIG. 2.

<1.3. Principle of Localization>

Next, when the input/output apparatus 20 superimposes a virtual object onto a real object, an example of the principle of the technique for estimating the position and attitude of itself in a real space (that is, localization) will be described.

As a specific example of localization, the input/output apparatus 20 uses an imaging unit, such as a camera provided on itself, to capture a marker or the like of known size presented on a real object in the real space. Additionally, by analyzing the captured image, the input/output apparatus 20 estimates at least one of the relative position and attitude of oneself with respect to the marker (and by extension, the real object on which the marker is presented). Note that the following description focuses on a case in which the input/output apparatus 20 estimates the position and the altitude of itself, but the input/output apparatus 20 may also estimate only one of the position and attitude of itself.

Specifically, it is possible to estimate the relative direction of the imaging unit (and by extension, the input/output apparatus 20 in which the imaging unit is provided) with respect to the marker, in accordance with the direction of the marker (for example, the direction of a pattern or the like of the marker) captured in the image. Also, in the case in which the size of the marker is known, it is possible to estimate the distance between the marker and the imaging unit (that is, the input/output apparatus 20 in which the imaging unit is provided), in accordance with the size of the marker in the image. More specifically, if the marker V10 is captured from farther away, the marker is captured smaller. Also, the range of the real space captured in the image at this time can be estimated on the basis of the angle of view of the imaging unit. By utilizing the above characteristics, it is possible to back-calculate the distance between the marker and the imaging unit in accordance with the size of the marker captured in the image (in other words, the proportion of the angle of view occupied by the marker). According to a configuration like the above, the input/output apparatus 20 becomes able to estimate the relative position and attitude of itself with respect to the marker.

In addition, the technology named simultaneous localization and mapping (SLAM) may also be utilized for localization of the input/output apparatus 20. SLAM refers to a technology that executes localization and the creation of an environment map in parallel by utilizing an imaging unit such as a camera, various sensors, an encoder, and the like. As a more specific example, with SLAM (particularly visual SLAM), the three-dimensional shape of a captured scene (or subject) is successively reconstructed on the basis of a moving image captured by the imaging unit. Additionally, by associating the reconstruction result of the captured scene with a detection result of the position and attitude of the imaging unit, the creation of a map of the surrounding environment and the estimation of the position and attitude of the imaging unit (and by extension, the input/output apparatus 20) are performed. Note that, for example, by providing the input/output apparatus 20 with various sensors, such as an acceleration sensor and an angular velocity sensor, it is possible to estimate the position and the attitude of the imaging unit as information indicating relative change on the basis of the detection results of the sensors. Obviously, as long as the position and the attitude of the imaging unit can be estimated, the method is not necessarily limited only to a method based on the detection results of various sensors such as an acceleration sensor and an angular velocity sensor.

Based on a configuration like the above, for example, estimation results for the relative position and attitude of the input/output apparatus 20 with respect to the known marker based on an imaging result of marker by the imaging unit may also be utilized in an initialization process and position correction in SLAM described above. According to such a configuration, even under circumstances in which the marker is not included inside the angle of view of the imaging unit, by localization based on SLAM receiving the results of previously executed initialization and position correction, the input/output apparatus 20 is able to estimate the position and attitude of oneself with respect to the marker (and by extension, the real object on which the marker is presented).

When the input/output apparatus 20 superimposes a virtual object onto a real object, an example of the principle of the technique for estimating the position and attitude of itself in a real space (that is, localization) has been described. Note that in the following, the position and the attitude of the input/output apparatus 20 with respect to a physical object (real object) in the real space will be described as being possible to estimate on the basis of the basic principle described above, for example.

<<2. Investigation Regarding Delay Associated with Drawing of Virtual Object>>

Next, after first describing the delay associated with the drawing of a virtual object and an example of a mechanism that alleviates the impact of such delay, the challenges of the information processing system according to the present embodiment will be organized.

Depending on the display information to present as the virtual object, the processing load of drawing the virtual object becomes comparatively high, and in some cases, a delay occurs from when the drawing of the virtual object on the basis of what is called AR or VR is started until the virtual object is output as display information. For this reason, for example, in association with this delay, if a change occurs in the position and direction of a viewpoint of a user before the drawn virtual object is presented to the user, a misalignment occurs in the relative positional relationship between the position of the viewpoint and the position where the drawn virtual object is superimposed. In some cases, for example, such misalignment is recognized by the user as a misalignment of the position in the space where the virtual object is superimposed.

In contrast, with VR, for example, by accounting for the delay associated with the drawing of the virtual object and correcting the display position, in the virtual space, of the virtual object after the drawing, the impact of the delay associated with drawing is reduced in some cases. For example, FIG. 3 is an explanatory diagram for explaining an example of a process related to correcting a display position of a virtual object in response to a delay associated with the drawing of the virtual object.

Figure 3:
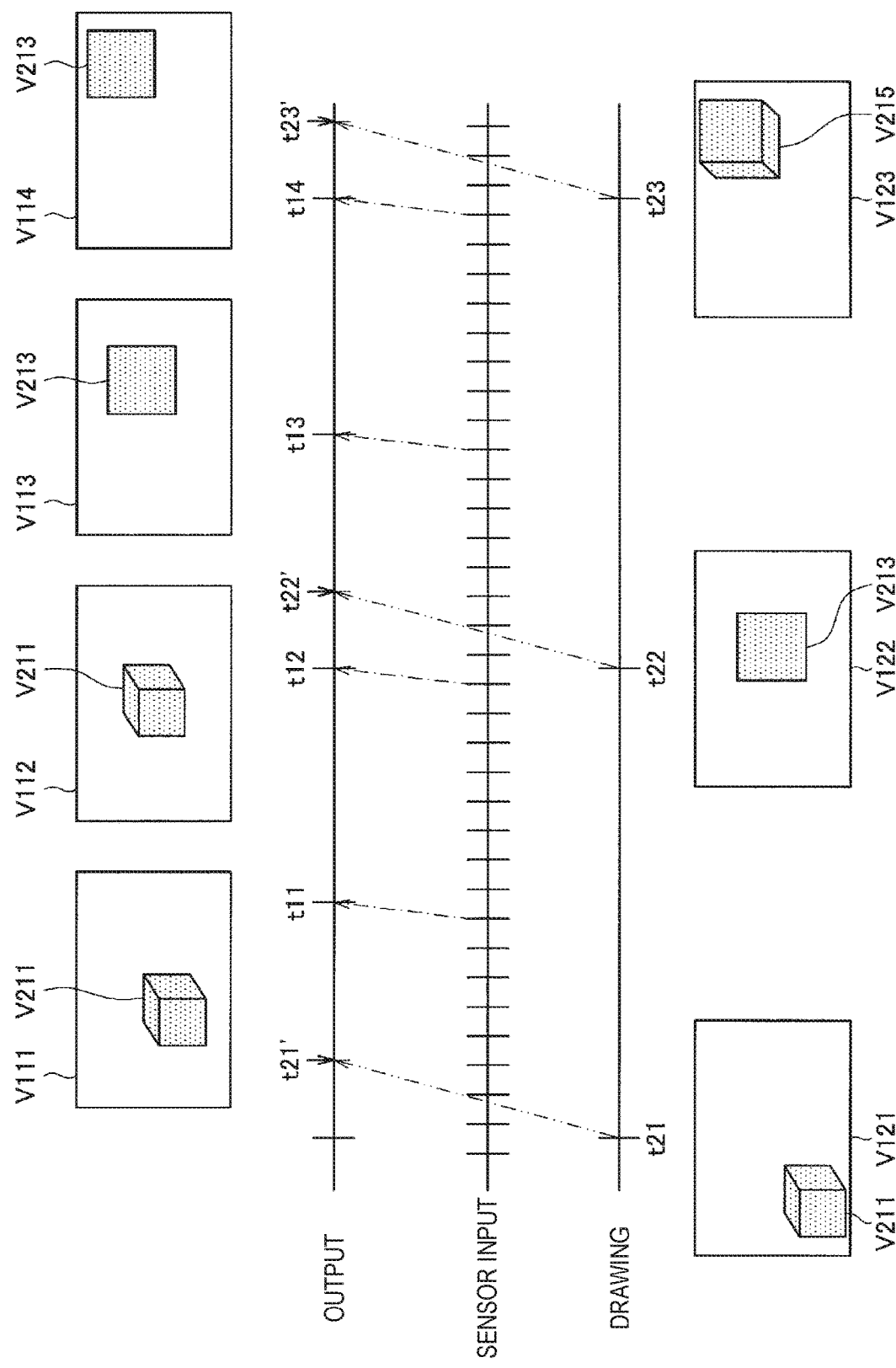
FIG. 3 is an explanatory diagram for explaining an example of a process related to the correction of a display position of a virtual object.

FIG. 3 schematically illustrates process timings along a time series for each of the drawing of a virtual object, sensor input based on a detection result of a change in the position and direction of a viewpoint, and output of the drawn virtual object. In FIG. 3, the reference signs t21 to t23 illustrate the start timings of the drawing of the virtual object, while the reference signs t21' to t23' illustrate the end timings of the drawing of the virtual object. Also, the reference signs V121 to V123 illustrate an example of images drawn at the timings t21 to t23, and schematically illustrate the shapes and presentation positions of the virtual object presented inside the images. Similarly, the reference signs t11 to t14 illustrate the output timings of the drawn virtual object. Also, the reference signs V111 to V114 illustrate an example of images output at the timings t11 to t14, and schematically illustrate the shapes and presentation positions of the virtual object presented inside the images. Also, as illustrated in FIG. 3, sensor input is acquired on a faster cycle (higher frequency) compared to the cycle (frequency) on which the virtual object is drawn.

For example, at the timing t21, the drawing of the image V121 in which the virtual object v211 is presented is started, and the drawing ends at the timing t21'. After that, when the image output timing t11 arrives, on the basis of the sensor input acquired immediately before the timing t11, the display position of the virtual object V211 presented in the image V121 is corrected, and the corrected image V111 is output. Next, the image output timing t12 arrives, but at this time, the drawing of the new image (for example, the image V122) still has not completed. For this reason, on the basis of the sensor input acquired immediately before the timing t12, the display position of the virtual object V211 presented in the image V111 is corrected, and the corrected image V112 is output.

Also, at the timing t22, the drawing of the image V122 in which the virtual object v213 is presented is started, and the drawing ends at the timing t22'. In other words, at the display timings t13 and t14 which arrive after the timing t22', the virtual object v213 is presented, and in addition, the images V113 and V114 in which the display position of the virtual object v213 is corrected on the basis of the sensor input acquired immediately before are output, respectively. Also, for the image V123 in which the virtual object v215 is presented, the drawing is started at the timing t23, and the drawing ends at the timing t23'. In other words, the image in which the virtual object v215 is presented is output at the timing t23' and thereafter.

By control like the above, even if a delay occurs from when the drawing of a virtual object is started until the virtual object is output as display information, by correcting the display position of the drawn virtual object, it becomes possible to alleviate the impact of the delay.

On the other hand, since AR has the characteristic of superimposing a virtual object onto a real space, in the case of simply correcting the display position of the virtual object, a misalignment occurs between the optical image of the real space seen by the user and the display of the virtual object in some cases. For example, FIGS. 4 and 5 are explanatory diagrams for explaining an example of the impact of delay associated with the drawing of a virtual object in AR.

First, the example illustrated in FIG. 4 will be described. The example illustrated in FIG. 4 illustrates an example of control related to the presentation of virtual objects V221 and V223 in a case of moving the position of a viewpoint P11 of a user while in a state in which the virtual objects V221 and V223 are presented superimposed onto a real space. In FIG. 4, each drawing on the left side illustrates the state before the position of the viewpoint P11 moves, while each drawing on the right side illustrates the state after the position of the viewpoint P11 moves.

Figure 4:
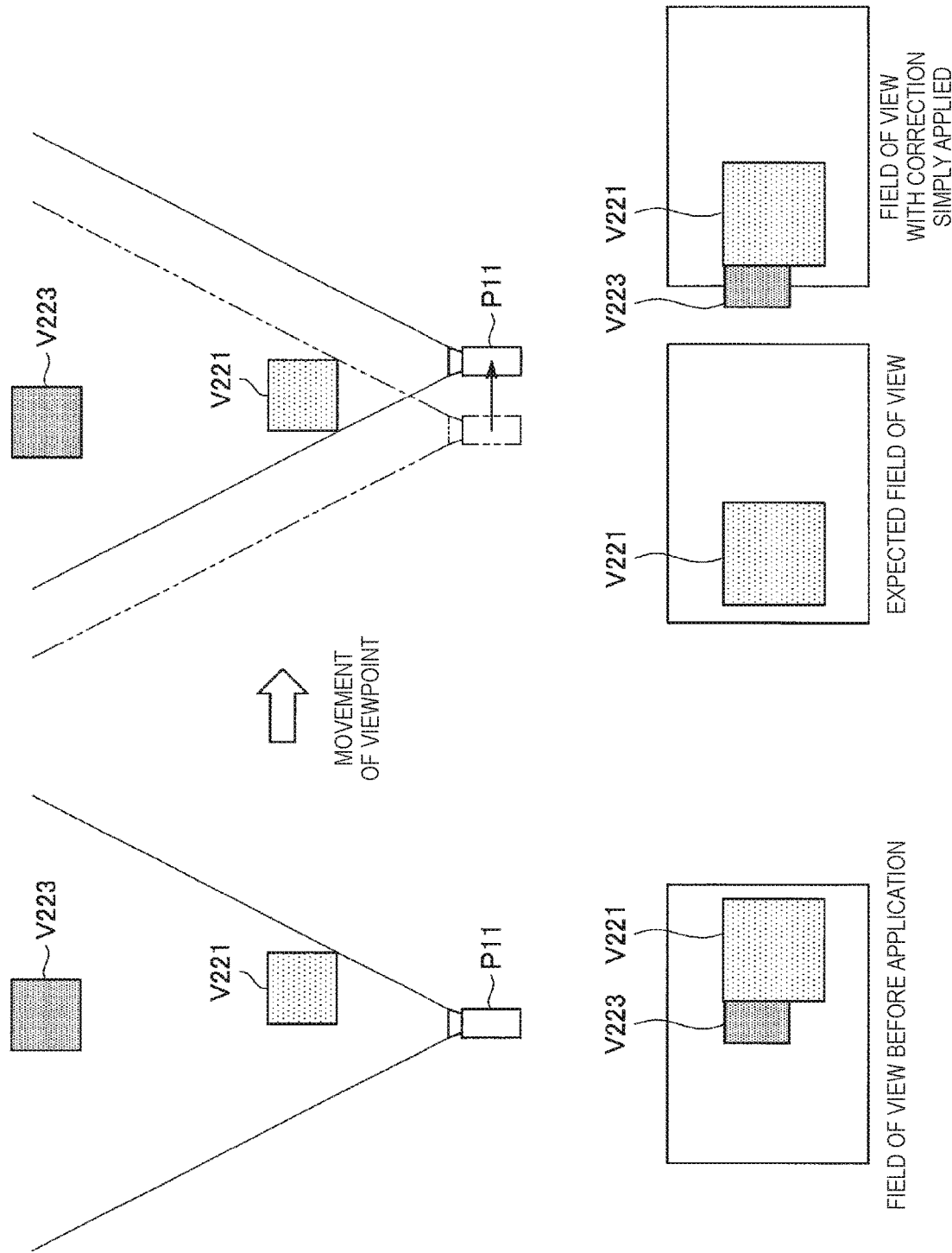
FIG. 4 is an explanatory diagram for explaining an example of the impact of delay associated with the drawing of a virtual object in AR.
Figure 5:
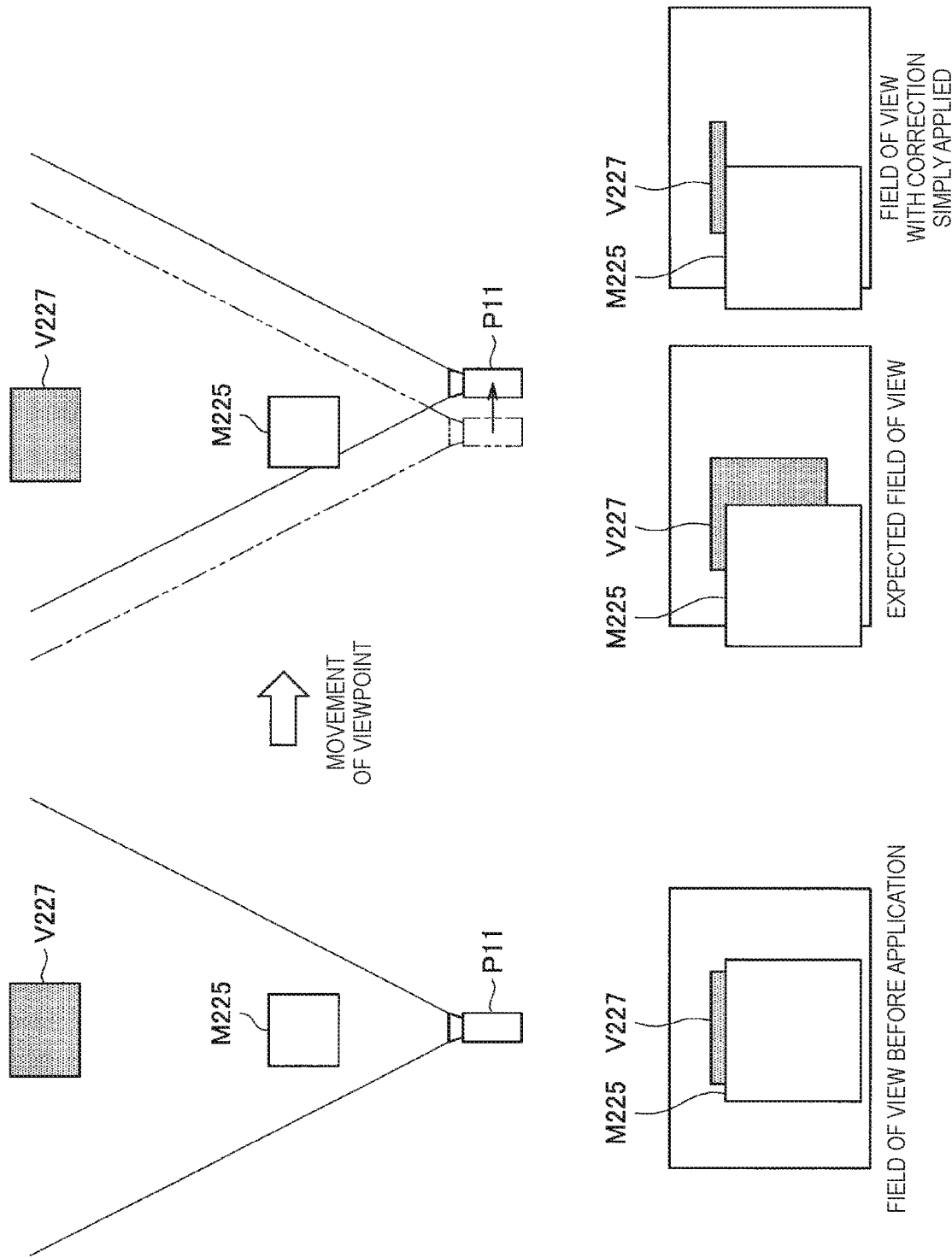
FIG. 5 is an explanatory diagram for explaining an example of the impact of delay associated with the drawing of a virtual object in AR.

For example, in the case in which the viewpoint P11 and each of the virtual objects V221 and V223 are in a positional relationship as illustrated in the drawing in the upper-left of FIG. 4, the optical image seen by the user becomes like the drawing illustrated as "Field of view before application".

After that, assume that the viewpoint P11 translates rapidly in the horizontal direction as illustrated in the drawing in the upper-right of FIG. 4, and the display positions of the virtual objects V221 and V223 are corrected in association with the movement of the viewpoint P11. In this case, from the positional relationship between the moved viewpoint P11 and each of the virtual objects V221 and V223, it is desirable for the optical image seen by the user to be in a state in which the virtual object V223 is masked by the virtual object V221, like the drawing illustrated as "Expected field of view". This is because the amount of movement of each optical image inside the user's field of view in association with the movement of the viewpoint P11 is different depending on the position in the depth direction based on the viewpoint P11. More specifically, the amount of movement inside the user's field of view in association with the movement of the viewpoint P11 for an object positioned closer to the user is larger than the amount of movement inside the field of view for an object positioned farther away from the user.

On the other hand, the drawing illustrated as "Field of view with correction simply applied" illustrates an example of the optical image seen by the user in the case of correcting the display position similarly by a common correction amount with respect to each of the virtual objects V221 and V223. In this case, among the virtual objects V221 and V223, the correction amount of the display position for at least one is different from the value corresponding to the positional relationship illustrated in the drawing in the upper-right, and thus an optical image which is different from the originally expected optical image will be seen by the user. Note that although it is possible for the phenomenon described with reference to FIG. 4 to also occur in VR, since a virtual object is superimposed on a real space in AR, the user tends to feel a greater sense of unnaturalness due to misalignment of the positional relationship between an object in the real space and the virtual object.

Next, the example illustrated in FIG. 5 will be described. The example illustrated in FIG. 5 illustrates an example of control related to the presentation of a virtual object V227 in a case of moving the position of the viewpoint P11 of the user while in a state in which the virtual object V227 is presented superimposed onto a real space in which a real object M225 is disposed. In FIG. 5, each drawing on the left side illustrates the state before the position of the viewpoint P11 moves, while each drawing on the right side illustrates the state after the position of the viewpoint P11 moves.

For example, in the case in which the viewpoint P11, the real object M225, and the virtual object V227 are in a positional relationship as illustrated in the drawing in the upper-left of FIG. 5, the optical image seen by the user becomes like the drawing illustrated as "Field of view before application". In other words, the virtual object V227 is positioned behind the real object V225, part of the virtual object V227 is masked by the real object V225, and only the top part of the virtual object V227 is seen by the user.

After that, assume that the viewpoint P11 translates rapidly in the horizontal direction as illustrated in the drawing in the upper-right of FIG. 5, and the display position of the virtual object V227 is corrected in association with the movement of the viewpoint P11. In this case, from the positional relationship between the moved viewpoint P11, the real object M225, and the virtual object V227, it is desirable for the optical image seen by the user to be like the drawing illustrated as "Expected field of view". In other words, it is desirable to reach a state in which the part of the virtual object V227 masked by the real object M225 before the movement of the viewpoint P11 is visibly presented in association with the movement of the viewpoint P11.

On the other hand, the drawing illustrated as "Field of view with correction simply applied" illustrates an example of the optical image seen by the user in the case of correcting the display position simply with respect to the virtual object V227 presented as the "Field of view before application". In this case, in the "Field of view before application", the portion masked by the real object V225 among the virtual object V227 is excluded from the drawing target. For this reason, in the case of simply correcting only the display position of the virtual object V227 in association with the movement of the viewpoint P11, the portion masked by the real object V225 before the movement of the viewpoint P11 is not presented, and as a result, the virtual object V227 with a missing portion is seen by the user.

In light of circumstances like the above, the present disclosure proposes an example of a mechanism making it possible to reduce the impact associated with a drawing delay further and also correct the display of a virtual object in a more favorable mode under conditions in which the virtual object is superimposed onto a real space.

<<3. Technical Features>>

Hereinafter, the technical features of the information processing system 1 according to the present embodiment will be described.

<3.1. Basic Principle>

Figure 6:
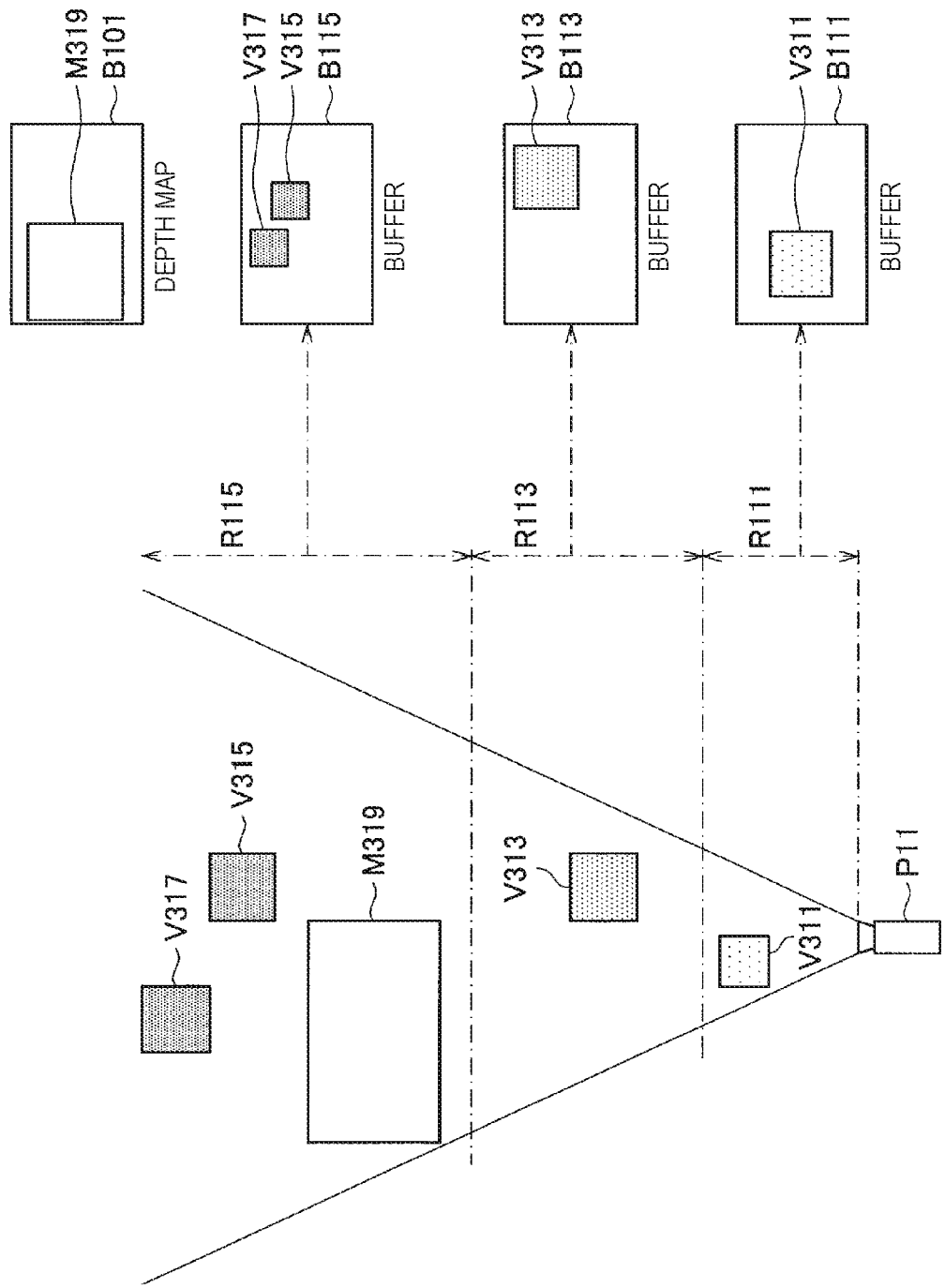
FIG. 6 is an explanatory diagram for explaining a basic principle of the operation of the information processing system according to the embodiment.

First, FIG. 6 will be referenced to describe the basic principle for a representative example of operation whereby the information processing system 1 according to the present embodiment presents a virtual object to a user such that the virtual object is superimposed onto a real space on the basis of AR technology. FIG. 6 is an explanatory diagram for explaining the basic principle of operation related to the presentation of a virtual object based on AR technology by the information processing system according to the present embodiment.

As illustrated in FIG. 6, the information processing system 1 according to the present embodiment divides a region (that is, a region in a real space) corresponding to the field of view taking the viewpoint P11 as the point of origin into multiple regions R111, R113, and R115 along the depth direction, and associates mutually different buffers with each of the divided regions. Note that the viewpoint P11 may correspond to the position of the input/output apparatus 20 in FIG. 1, for example, and by extension, may correspond to the position of a predetermined site where the input/output apparatus 20 is worn, such as the user's head or the like. For example, in the example illustrated in FIG. 6, a buffer B111 is associated with the region R111. Similarly, a buffer B113 is associated with the region R113, and a buffer B115 is associated with the region R115. Also, in the information processing system 1 according to the present embodiment, the distance (that is, the depth) between a real object existing in the space and the viewpoint P11 is measured, and a buffer B101 for drawing information indicating the depth measurement result (hereinafter also designated the "depth map") is provided separately from the buffers B111, B113, and B115.

Based on a configuration like the above, the information processing system 1 draws virtual objects to present superimposed onto the real space in the buffers corresponding to the positions in the real space where the virtual objects are to be presented. For example, in the example illustrated in FIG. 6, a virtual object V311 is presented positioned in the region R111. For this reason, the information processing system 1 draws the virtual object V311 in the buffer B111 associated with the region R111. Similarly, the information processing system 1 draws a virtual object V313 to present positioned in the region R113 in the buffer B113 associated with the region R113. Also, the information processing system 1 draws virtual objects V315 and V317 to present positioned in the region R115 in the buffer B115 associated with the region R115. Also, as described above, the information processing system 1 measures the distance (depth) to a real object M319 existing in the real space, and draws the measurement result in the buffer B101.

Next, in the case in which the viewpoint P11 moves after drawing each virtual object in each buffer, in accordance with the amount of movement of the viewpoint P11, the information processing system 1 corrects the display position of each virtual object drawn in each buffer according to the region associated with the buffer. Also, on the basis of the depth map drawn in the buffer B101, the information processing system 1 recognizes the position in the real space (particularly, the position in the depth direction) of the real object M319, and compares the positional relationship (particularly, the positional relationship along the depth direction) between the real object M319 and each virtual object drawn in each buffer. Subsequently, on the basis of the comparison result, the information processing system 1 presents, for each virtual object drawn in each of the buffers B111 to B115, the portion not masked by the real object M319 and the other virtual objects to the user through the input/output apparatus 20.

On the basis of a configuration like the above, the information processing system 1 according to the present embodiment individually corrects the display position of each virtual object according to the position in the real space (particularly, the position in the depth direction) where the virtual object is presented. Also, the information processing system 1 according to the present embodiment controls the output of each virtual object according to the positional relationship between the viewpoint P11, the real object, and each virtual object. With this arrangement, the information processing system 1 according to the present embodiment becomes able to individually correct the impact associated with the drawing delay according to the position where the virtual object is superimposed, and in addition, control the display of each virtual object while accounting for the masking by the real object and the other virtual objects.

The above references FIG. 6 to describe the basic principle of operation whereby the information processing system 1 according to the present embodiment presents a virtual object to a user such that the virtual object is superimposed onto a real space on the basis of AR technology.

<3.2. Functional Configuration>

Figure 7:
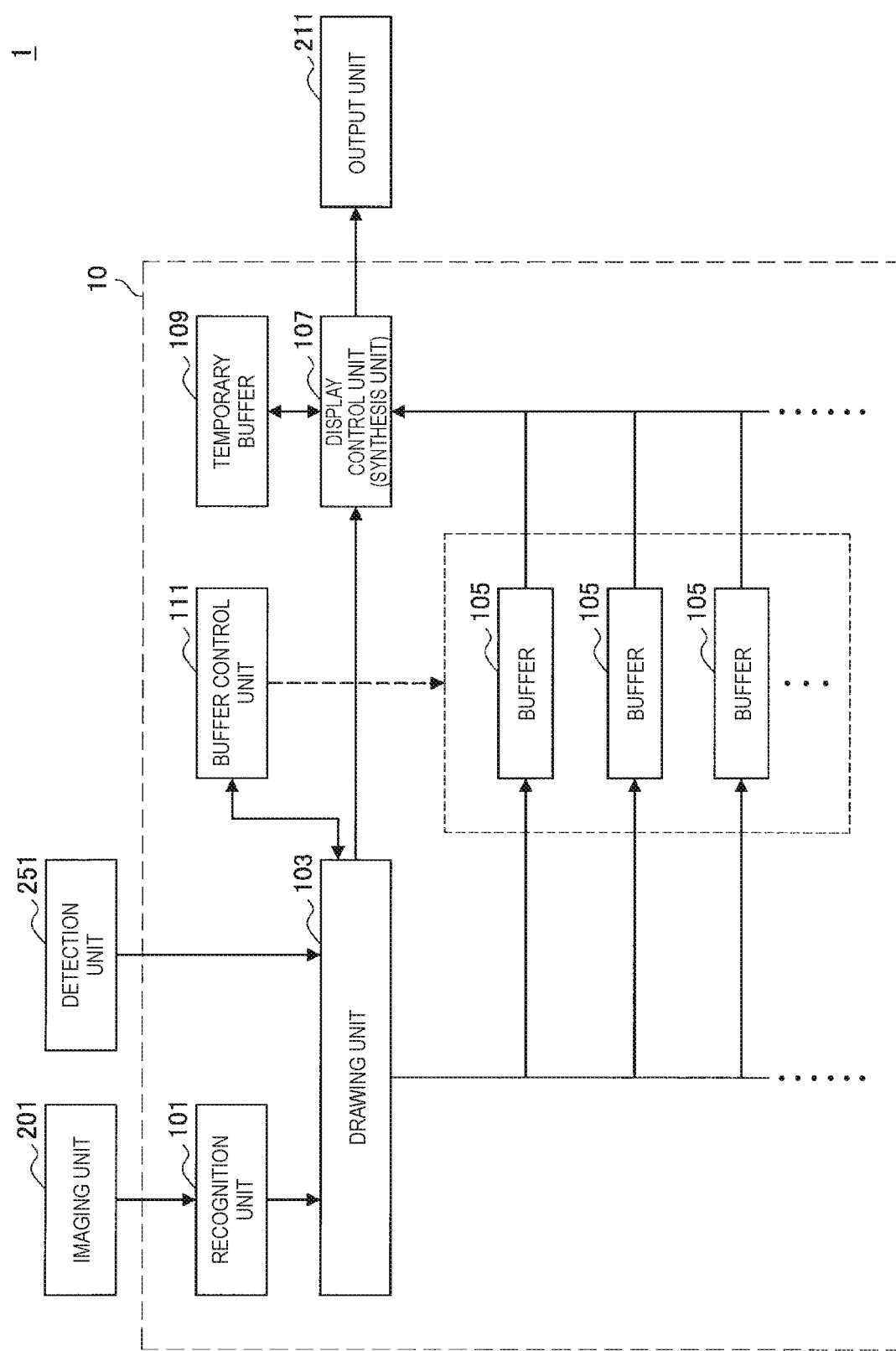
FIG. 7 is a block diagram illustrating an example of a functional configuration of the information processing system according to the embodiment.

Next, FIG. 7 will be referenced to describe an example of the functional configuration of the information processing system 1 according to the present embodiment, with particular focus on the configuration of the information processing apparatus 10. FIG. 7 is a block diagram illustrating an example of the functional configuration of the information processing system according to the present embodiment.

As illustrated in FIG. 7, the information processing system 1 according to the present embodiment includes an imaging unit 201, a detection unit 251, an output unit 211, and the information processing apparatus 10. The imaging unit 201, the detection unit 251, and the output unit 211 correspond to a configuration of part of the input/output apparatus 20 described with reference to FIGS. 1 and 2. Note that the output unit 211 corresponds to the output unit 211 in FIG. 2.

The imaging unit 201 corresponds to the imaging units 201a and 201b configured as a stereo camera in FIG. 2. In other words, the imaging unit 201 captures an image of a physical object (subject) in a real space, and outputs the captured image to the information processing apparatus 10.

In addition, the detection unit 251 schematically illustrates a portion related to the acquisition of information for detecting changes in the position and attitude of the input/output apparatus 20 (and by extension, the motion of the head of the user wearing the input/output apparatus 20). As a specific example, the detection unit 251 may also include various sensors, such as an acceleration sensor, an angular velocity sensor, and the like. The detection unit 251 outputs acquired information to the information processing apparatus 10. With this arrangement, the information processing apparatus 10 becomes able to recognize changes in the position and attitude of the input/output apparatus 20.

Next, a configuration of the information processing apparatus 10 will be described. As illustrated in FIG. 7, the information processing apparatus 10 includes a recognition unit 101, a drawing unit 103, multiple buffers 105, a display control unit 107, a temporary buffer 109, and a buffer control unit 111.

The recognition unit 101 acquires an image captured by the imaging unit 201 and performs analysis processing on the acquired image, thereby recognizing the physical object (subject) in the real space captured in the image. As a specific example, the recognition unit 101 acquires images (hereinafter also designated a "stereo image") captured from multiple different viewpoints from the imaging unit 201 configured as a stereo camera, and on the basis of the parallax between the acquired images, measures the distance to the physical object captured in the images for each pixel in the images. With this arrangement, the recognition unit 101 becomes able to estimate or recognize the relative positional relationship (particularly, the positional relationship in the depth direction) in the real space between the imaging unit 201 (and by extension, the input/output apparatus 20) and each physical object captured in the image, at the timing when the image is captured.

Also, by executing localization and the creation of an environment map on the basis of SLAM, the recognition unit 101 may recognize the positional relationship in the real space between the input/output apparatus 20 and a physical object captured in the image. In this case, for example, the recognition unit 101 may acquire information indicating changes in the position and attitude of the input/output apparatus 20 from the detection unit 251, and utilize the information for localization based on SLAM.

As above, the recognition unit 101 recognizes the position in the real space of each physical object captured in the image, and outputs information indicating a recognition result to the drawing unit 103. Note that in this description, as described above, the recognition unit 101 is described as outputting information (that is, a depth map) indicating the depth (the distance to a physical object) measured for each pixel in the image to the drawing unit 103.

Note that, as described above, the method of measuring the distance to the subject is not limited only to the measurement method based on a stereo image described above. For this reason, the configuration corresponding to the imaging unit 201 may also be modified appropriately to match the distance measurement method. As a specific example, in the case of measuring the distance to the subject on the basis of TOF, instead of the imaging unit 201, a light source that projects infrared rays and a photosensor for detecting infrared rays which are projected from the light source and reflected by the subject may be provided. Also, when measuring the distance to a physical object, multiple measurement methods may also be used. In this case, in accordance with the measurement method to use, a configuration for acquiring information to use in the measurement may be provided in the input/output apparatus 20 or the information processing apparatus 10. Obviously, the content of the information (for example, a depth map) indicating the result of recognizing the position in the real space of each physical object captured in the image may also be modified appropriately according to the applied measurement method.

The multiple buffers 105 correspond to each of the buffers B101 and B111 to B115 described with reference to FIG. 6. The multiple buffers 105 are assigned to storage areas in at least a part of a storage apparatus for holding various data temporarily or permanently, such as flash memory or random access memory (RAM), for example. Note that by logically dividing a single storage area into multiple areas, the buffers 105 may be assigned to each of the divided areas. Also, as another example, mutually different buffers 105 may be assigned to each storage area of mutually different storage apparatus. Obviously, even in the case of providing multiple storage apparatus, the number of buffers 105 and the number of storage apparatus do not have to match. In this case, for example, by virtually prescribing the storage areas of each of multiple storage apparatus as a single storage area, and logically dividing the virtual storage area into multiple areas, the buffers 105 may be assigned to each of the areas.

The buffer control unit 111 directly or indirectly controls the association between each of the multiple buffers 105 and each virtual object treated as a drawing target. For example, as illustrated in FIG. 6, the buffer control unit 111 may associate each of the multiple regions R111 to R115 obtained by dividing the region corresponding to the field of view taking the viewpoint P11 as the point of origin along the depth direction to mutually different buffers 105. With this arrangement, the virtual objects presented in each of the regions R111 to R115 are drawn in the buffer 105 associated with the corresponding region. Additionally, the buffer control unit 111 may also allocate at least part of the multiple buffers 105 as a buffer for drawing the depth map (that is, the buffer B101 illustrated in FIG. 6).

Note that the buffer control unit 111 may also change the association between each of the multiple buffers 105 and each virtual object treated as a drawing target dynamically according to changes in various states and conditions. Also, the buffer control unit 111 may change the size of the storage area assigned as the multiple buffers 105 and the number of the buffers 105 dynamically according to various states and conditions. Note that an example of these controls will be described separately later as a modification.

Additionally, the buffer control unit 111 notifies the drawing unit 103 of information indicating the association between each of the multiple buffers 105 and the drawing targets (for example, each virtual object and the depth map). With this arrangement, the drawing unit 103 becomes able to recognize each buffer 105 to treat as the drawing destination for each virtual object and the depth map treated as the drawing targets.

Note that the setting of the storage area to assign as the multiple buffers 105 and the association between each of the multiple buffers 105 and the drawing targets may also be preset in a fixed manner. In this case, if the setting is configured to be recognizable by the drawing unit 103, the buffer control unit 111 does not necessarily need to be provided.

The drawing unit 103 receives, from the buffer control unit 111, the notification of information indicating the association between each of the multiple buffers 105 and the drawing targets. With this arrangement, the drawing unit 103 the drawing unit 103 recognizes each buffer 105 to treat as the drawing destination for each virtual object and the depth map treated as the drawing targets.

Also, the drawing unit 103 acquires, from the recognition unit 101, the depth map generated on the basis of the recognition result of a physical object (subject) in the real space. The drawing unit 103 draws the acquired depth map in the corresponding buffer among the multiple buffers 105.

Also, the drawing unit 103 acquires, from the detection unit 251, information indicating changes in the position and attitude of the input/output apparatus 20 at intervals of a predetermined timing, and recognizes changes in the position and direction of the viewpoint on the basis of the acquired information. Next, the drawing unit 103 specifies the presentation position, shape (for example, a shape corresponding to the presentation direction), and the like of each virtual object according to the positional relationship between the viewpoint based on the result of recognizing changes in the position and direction of the viewpoint, and each virtual object. Subsequently, the drawing unit 103 draws each virtual object in the buffer 105 with which the virtual object is directly or indirectly associated. Also, the drawing unit 103 successively outputs, to the display control unit 107 described later, information indicating the result of recognizing changes in the position and direction of the viewpoint based on the information acquired from the detection unit 251.

The display control unit 107 successively acquires information indicating the result of recognizing changes the position and direction of the viewpoint from the drawing unit 103. With this arrangement, the display control unit 107 becomes able to recognize changes in the position and direction of the viewpoint. Also, on the basis of the depth map drawn in at least part of the multiple buffers 105, the display control unit 107 recognizes the position in the real space of a real object positioned inside the field of view.

Also, when the drawing of each virtual object to each buffer 105 by the drawing unit 103 is completed, the display control unit 107 reads out each virtual object drawn in the buffer 105. Additionally, at the output timing of each virtual object, the display control unit 107 corrects the display position of each virtual object for each buffer 105 where the virtual object is drawn, according to the position and direction of the viewpoint at the output timing. Also, the display control unit 107 may correct the depth map (that is, the position and attitude of the real object) drawn in a predetermined buffer 105 according to the position and direction of the viewpoint at the output timing.

Next, the display control unit 107 synthesizes an image in which each virtual object is presented, according to the positional relationship between the viewpoint, the recognized real object, and each virtual object whose display position has been corrected. With this arrangement, among each of the virtual objects to be presented, the output of the masked portions of virtual objects which are at least partially masked by the real object or another virtual object is limited in a more natural mode. Note that a process related to the above correction and a process related to the above synthesis will be described separately later together with a description of the flow of a series of processes.

Note that when correcting the display position of each virtual object described above and executing the process related to synthesis of the image in which each virtual object is presented, the display control unit 107 may cause the temporary buffer 109 to temporarily hold temporary data and the like needed to execute the processes. The temporary buffer 109 is included in a storage apparatus such as flash memory or RAM, for example, and is a storage area for holding various data temporarily or permanently.

Subsequently, the display control unit 107 causes the output unit 211 to display the image that is, the image of each virtual object) generated by synthesizing each virtual object drawn in each buffer 105. With this arrangement, the user becomes able to see, through the output unit 211, each virtual object presented superimposed onto the real space.

The above references FIG. 7 to describe an example of the functional configuration of the information processing system 1 according to the present embodiment, with particular focus on the configuration of the information processing apparatus 10.

<3.3. Processes>

Figure 8:
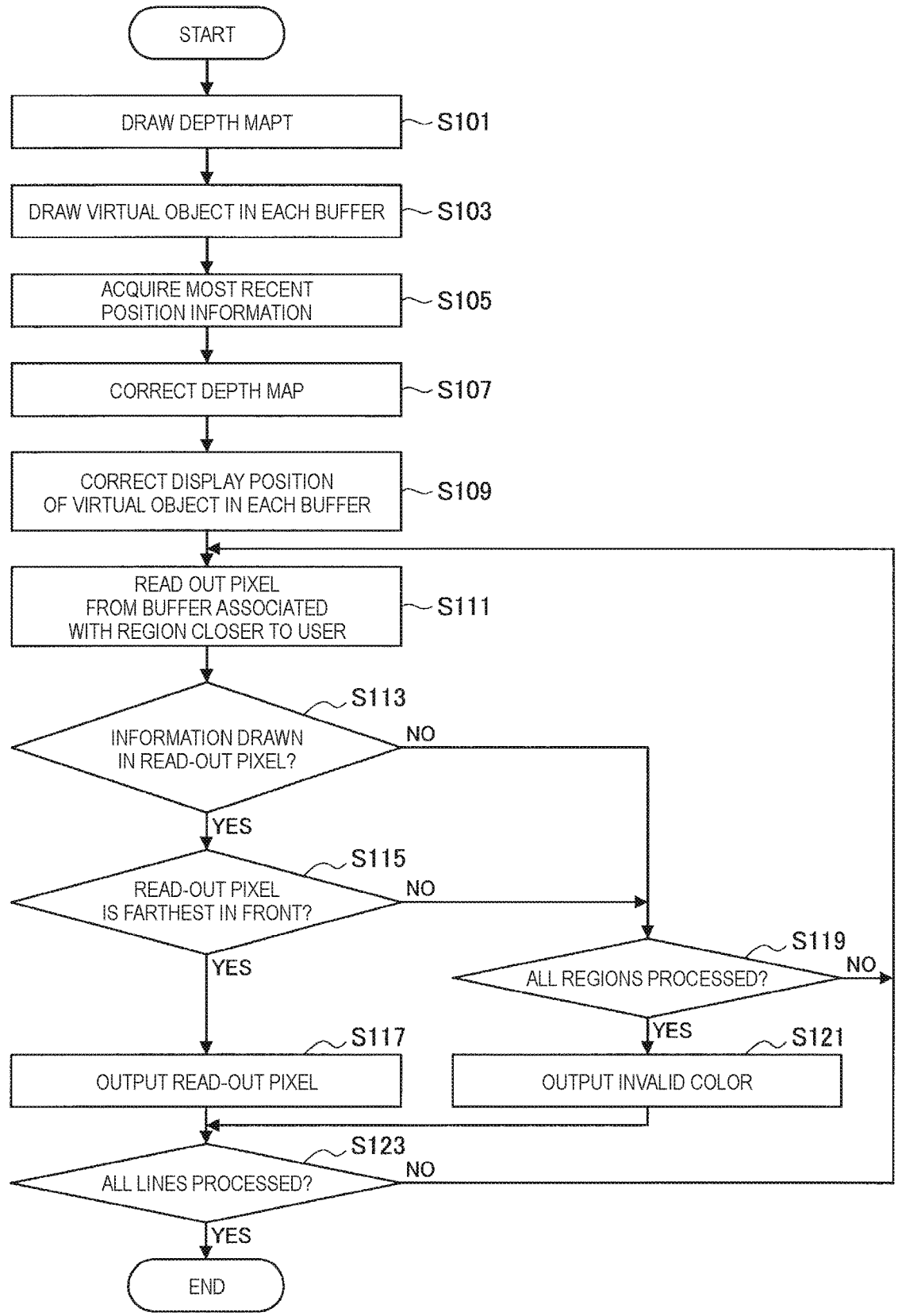
FIG. 8 is a flowchart illustrating an example of the flow of a series of processes of an information processing system 1 according to the embodiment.

Next, FIG. 8 will be referenced to describe an example of the flow of a series of processes of the information processing system 1 according to the present embodiment, with particular focus on processes related to the drawing of a virtual object and the output of the drawn virtual object. FIG. 8 is a flowchart illustrating an example of the flow of a series of processes of the information processing system 1 according to the present embodiment.

First, the information processing apparatus 10 (recognition unit 101) acquires a stereo image captured from the imaging unit 201 configured as a stereo camera, and on the basis of the acquired stereo image, generates a depth map by measuring the distance to a physical object captured in the image for each pixel in the image. Subsequently, the information processing apparatus 10 (drawing unit 103) draws the generated depth map in the corresponding buffer among the multiple buffers 105 (S101).

Also, the information processing apparatus 10 (drawing unit 103) acquires, from the detection unit 251, information indicating changes in the position and attitude of the input/output apparatus 20 at intervals of a predetermined timing, and recognizes changes in the position and direction of the viewpoint on the basis of the acquired information. The information processing apparatus 10 specifies the presentation position, shape, and the like of each virtual object according to the positional relationship between the viewpoint based on the recognition result and each virtual object. Subsequently, the information processing apparatus 10 draws each virtual object in a corresponding buffer 105 among the multiple buffers 105 (S103).

Also, the information processing apparatus 10 (display control unit 107) successively recognizes changes in the position and direction of the viewpoint on the basis of information acquired from the detection unit 251 (S105).

Next, the information processing apparatus 10 (display control unit 107) reads out the depth map from a predetermined buffer 105 into the temporary buffer 109, and corrects the depth map (that is, the position and attitude of the real object) according to the most recent position and direction of the viewpoint (S107). Note that at this time, the information processing apparatus 10 may read out the depth map into the temporary buffer 109 one scanline of the screen at a time, and execute the above correction on one read-out scanline at a time. With this arrangement, the positional relationship between the viewpoint and the real object is corrected according to the most recent position and direction of the viewpoint.

Also, the information processing apparatus 10 (display control unit 107) corrects the display position of each virtual object drawn in each buffer 105, according to the most recent position and direction of the viewpoint. Specifically, the information processing apparatus 10 computes a correction amount of the display position with respect to a virtual object drawn in each buffer 105, according to the depth (that is, the distance from the viewpoint) of the region (for example, the regions R111 to R115 illustrated in FIG. 6) in the real space associated with each buffer 105, and the most recent position and direction of the viewpoint. Subsequently, for example, by adjusting the read-out position of each buffer 105 according to the correction amount computed for each buffer 105, the information processing apparatus 10 corrects the display position of a virtual object drawn in each buffer 105 (S109).

Next, the information processing apparatus 10 (display control unit 107) successively targets each pixel of the output unit 211 to specify information (for example, color information) to output to each pixel. At this time, first, the information processing apparatus 10 reads out a target pixel from the buffer 105 associated with a region closer to the user from among the regions in the real space associated with each buffer 105 (S111).

The information processing apparatus 10 determines whether or not information for example, color information) is being drawn in the read-out pixel (S113). In the case in which information is being drawn in the read-out pixel (S113, YES), the information processing apparatus 10 compares the depth of the pixel to the depth of the position corresponding to the pixel in the depth map (S115). In the case in which the read-out pixel is positioned farthest in front, including the depth indicated by the depth map (that is, the position in the depth direction of the real object) (S115, YES), the information processing apparatus 10 causes the output unit 211 to output the information drawn in the read-out pixel (S117).

Also, in the case in which the read-out pixel is not positioned farthest in front (S115, NO), or in the case in which information is not being drawn in the read-out pixel (S113, NO), the information processing apparatus 10 checks whether or not the determination described above has been completed for all regions (S119). In the case in which a region not yet treated as a target of the determination exists (S119, NO), the information processing apparatus 10 treats a region closer to the user as a new target from among the regions not yet treated as a target of the determination. In this case, the information processing apparatus 10 reads out a corresponding pixel from the buffer 105 associated with the newly targeted region (S111), and executes the series of determinations described above on the pixel (S113, S115).

Note that in the case in which the above determination already has been executed on all regions (S119, YES), a state in which no information is being drawn in the target pixel, or a state in which a virtual object is being masked by the real object, is reached. For this reason, in this case, the information processing apparatus 10 causes the output unit 211 to output an invalid color as the information corresponding to the target pixel (S121).

As above, the information processing apparatus 10 continues the series of processes related to the output of information to a pixel described above until the output of information is completed for the series of pixels on each of all scanlines (S123, NO). Subsequently, when the output of information is completed for the series of pixels on each of all scanlines (S123, YES), the series of processes related to the drawing of a virtual object and the output of the drawn virtual object described above ends.

Note that the flow of the series of processes described above with reference to FIG. 8 is merely one example, and the execution units of each process are not necessarily limited to only the example illustrated in FIG. 8. For example, after executing the processes related to the drawing of the depth map and a virtual object labeled by the reference signs S101 and S103, the series of processes related to the display on information labeled by the reference signs S105 to S123 may be executed in multiple sets.

The above references FIG. 8 to describe an example of the flow of a series of processes of the information processing system 1 according to the present embodiment, with particular focus on processes related to the drawing of a virtual object and the output of the drawn virtual object.

<<4. Modifications>>

Next, modifications of the information processing system 1 according to the present embodiment will be described.

<4.1. Modification 1: Example of Association Between Virtual Object and Buffer>

In the embodiment described above, by dividing a region corresponding to the field of view taking the viewpoint as the point of origin into multiple regions along the depth direction, and associating mutually different buffers 105 with each of the divided regions, a buffer 105 is associated with each virtual object indirectly. In contrast, in the information processing system according to Modification 1, mutually different buffers 105 are associated directly with each virtual object to be presented.

Figure 9:
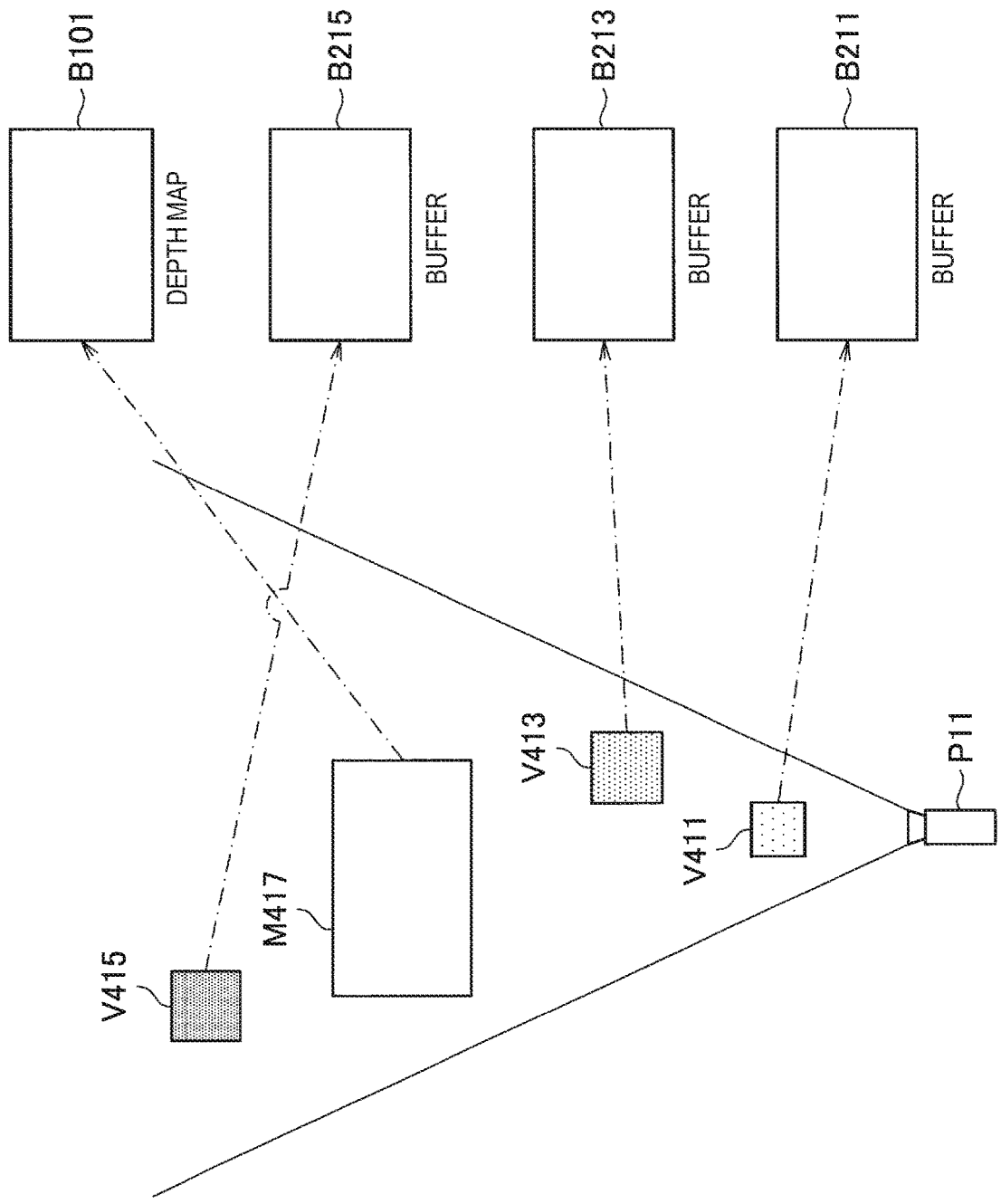
FIG. 9 is an explanatory diagram for describing an overview of an information processing system according to Modification 1.

For example, FIG. 9 is an explanatory diagram for explaining an overview of the information processing system according to Modification 1, and illustrates an example of associations between virtual objects to be presented and buffers. As illustrated in FIG. 9, the information processing system according to Modification 1 associates mutually different buffers with each of virtual objects V411, V413, and V415 to be presented. More specifically, the virtual object V411 is associated with a buffer B211. For this reason, the information processing system 1 draws the virtual object V411 in the buffer B211. Similarly, the virtual object V413 is associated with a buffer B213, and the virtual object V415 is associated with a buffer B215. Also, similarly to the embodiment described above, a depth map is drawn in the buffer B101 provided separately from the buffers B211, B213, and B215.

On the basis of a configuration like the above, in the case in which the viewpoint P11 moves, in accordance with the amount of movement of the viewpoint P11, the information processing system according to Modification 1 individually corrects the display position of each virtual object drawn in each buffer according to the positional relationship between the viewpoint P11 and the virtual object. Also, on the basis of the depth map drawn in the buffer B101, the information processing system recognizes the position in the real space of a real object M417, and compares the positional relationship between the real object M417 and each virtual object drawn in each buffer. Subsequently, on the basis of the comparison result, it is sufficient for the information processing system to present, among each of the virtual objects drawn in each of the buffers B211 to B215, the portion not masked by the real object M417 and the other virtual objects to the user through the input/output apparatus 20.

From a configuration like the above, the information processing system according to Modification 1 becomes able to correct the display of each virtual object more accurately, particularly under conditions in which the number of virtual objects to be presented is limited in advance.

<4.2. Modification 2: Example of Region Division>

Next, an example of a method of dividing a region in a real space (that is, a region corresponding to the field of view taking the viewpoint as the point of origin) into multiple regions will be described as Modification 2.

Figure 10:
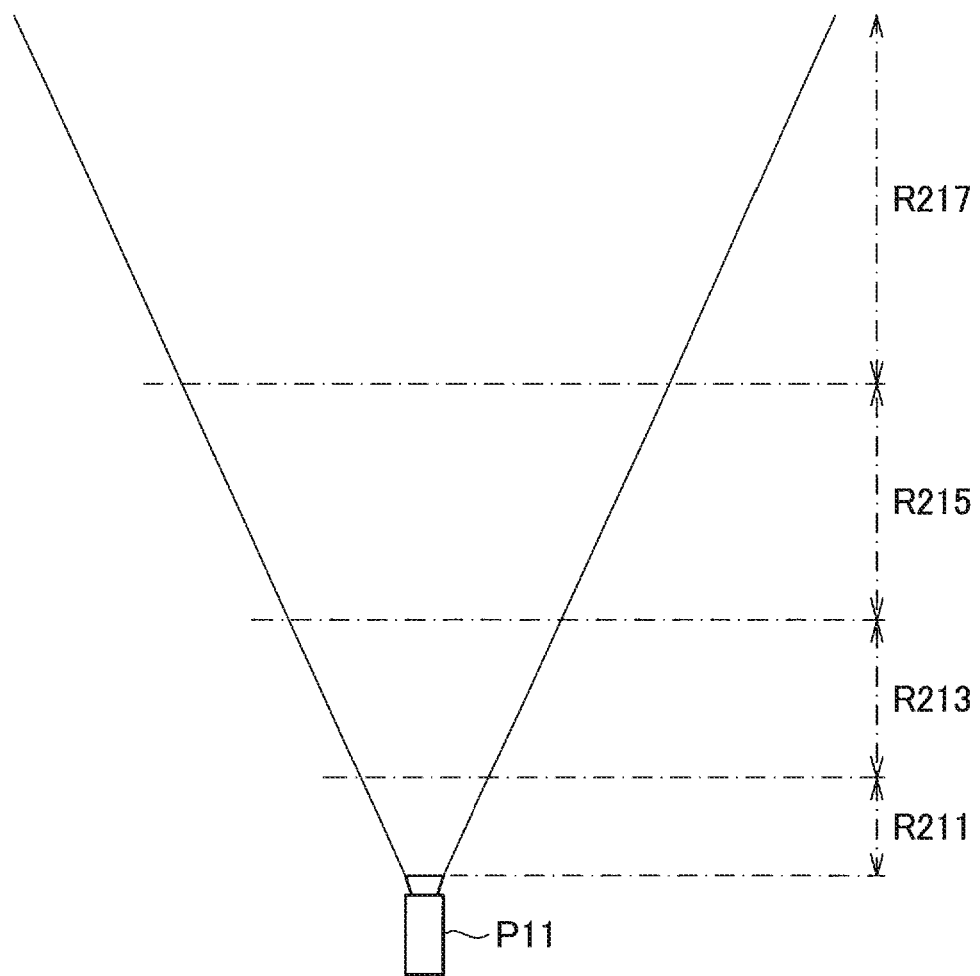
FIG. 10 is an explanatory diagram for explaining an overview of one mode of the information processing system according to Modification 2.

For example, FIG. 10 is an explanatory diagram for explaining an overview of one mode of the information processing system according to Modification 2, and illustrates an example of a method of dividing a region corresponding to the field of view taking the viewpoint P11 as the point of origin into multiple regions along the depth direction. Specifically, in the example illustrated in FIG. 10, when dividing the region corresponding to the field of view taking the viewpoint P11 as the point of origin into multiple regions R211 to R215, the region is divided such that the width in the depth direction becomes narrower for regions positioned farther in front. More specifically, in the example illustrated in FIG. 10, the width in the depth direction of the region R211 positioned farthest in front is the narrowest, and the width in the depth direction becomes wider successively in the order of the regions R213, R215, and R217. In this way, in the example illustrated in FIG. 10, the information processing system divides the area close to the user into finer regions, and associates mutually different buffers to each of the divided regions.

According to such a configuration, in the example illustrated in FIG. 10, in the case in which the viewpoint P11 moves, it becomes possible to correct the display position more finely for virtual objects presented superimposed closer to the viewpoint P11 (that is, the user). Particularly, in the case of correcting the display position in association with the movement of the viewpoint, there is a tendency for the correction amount of the display position to become larger for virtual objects positioned closer to the viewpoint, and for the correction amount of the display position to become smaller for virtual objects positioned farther away. From such characteristics, in the area closer to the viewpoint, there is a tendency for the difference in the correction amount due to the difference of position in the depth direction to become larger compared to positions more distant from the viewpoint. Also, the correction of the display position of each virtual object is executed in units of buffers as described above. From characteristics like the above, by dividing the area near the user into finer regions, and associated mutually different buffers with each of the divided regions, it becomes possible to utilize buffers efficiently, and in addition, improve the accuracy related to the correction of the display position of each virtual object.

Also, the above primarily describes an example of the case of dividing the region corresponding to the field of view taking the viewpoint P11 as the point of origin into multiple regions in advance (that is, statically dividing), but the division of the region may also be executed dynamically according to circumstances.

Figure 11:
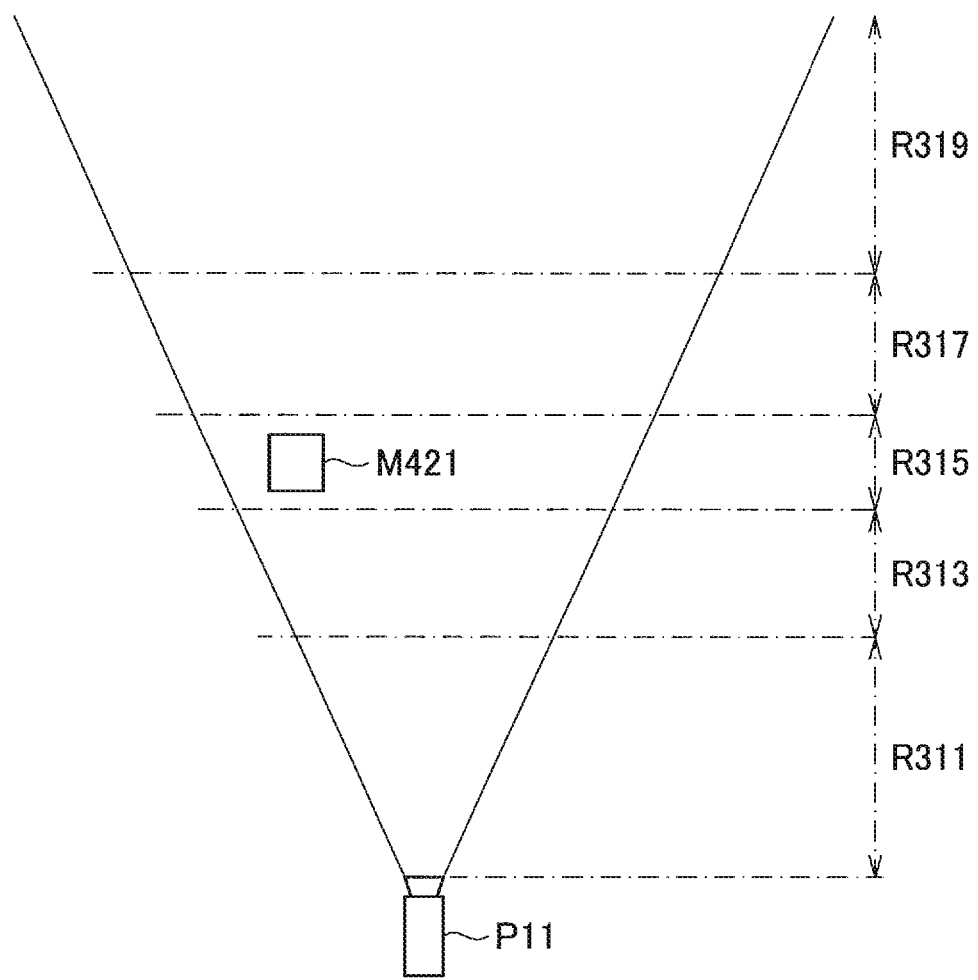
FIG. 11 is an explanatory diagram for explaining an overview of another mode of the information processing system according to Modification 2.

For example, FIG. 11 is an explanatory diagram for explaining an overview of another mode of the information processing system according to Modification 2, and illustrates an example of the case of dividing the area near a position in the real space that the user is focusing on into finer regions.

For example, in the example illustrated in FIG. 11, a case in which the user is directing one's line of sight towards a real object illustrated by the reference sign M421 is assumed, and the region corresponding to the field of view taking the viewpoint P11 as the point of origin is divided into multiple regions R311 to R319 in the depth direction. More specifically, in the example illustrated in FIG. 12, the width in the depth direction of the region R315 that includes the position that the user is focusing on (that is, the position at which the real object M421 exists), and of the regions R313 and R317 adjacent to the region R315, are set narrower than the other regions R311 and R319. Note that mutually different buffers are associated with each of the regions R311 to R319.

According to such a configuration, in the case in which the viewpoint P11 moves, the information processing system becomes able to correct the display position more finely for virtual objects presented superimposed closer to the position that the user is focusing on.

Also, under conditions such as presenting a moving virtual object to the user, the region corresponding to the field of view taking the viewpoint P11 as the point of origin may be divided into multiple regions dynamically according to a result of predicting the motion of the virtual object. For example, FIG. 12 is an explanatory diagram for explaining an overview of another mode of the information processing system according to Modification 2, and illustrates an example of the case of dividing a region in a real space into multiple regions according to a result of predicting the motion of a virtual object.

Figure 12:
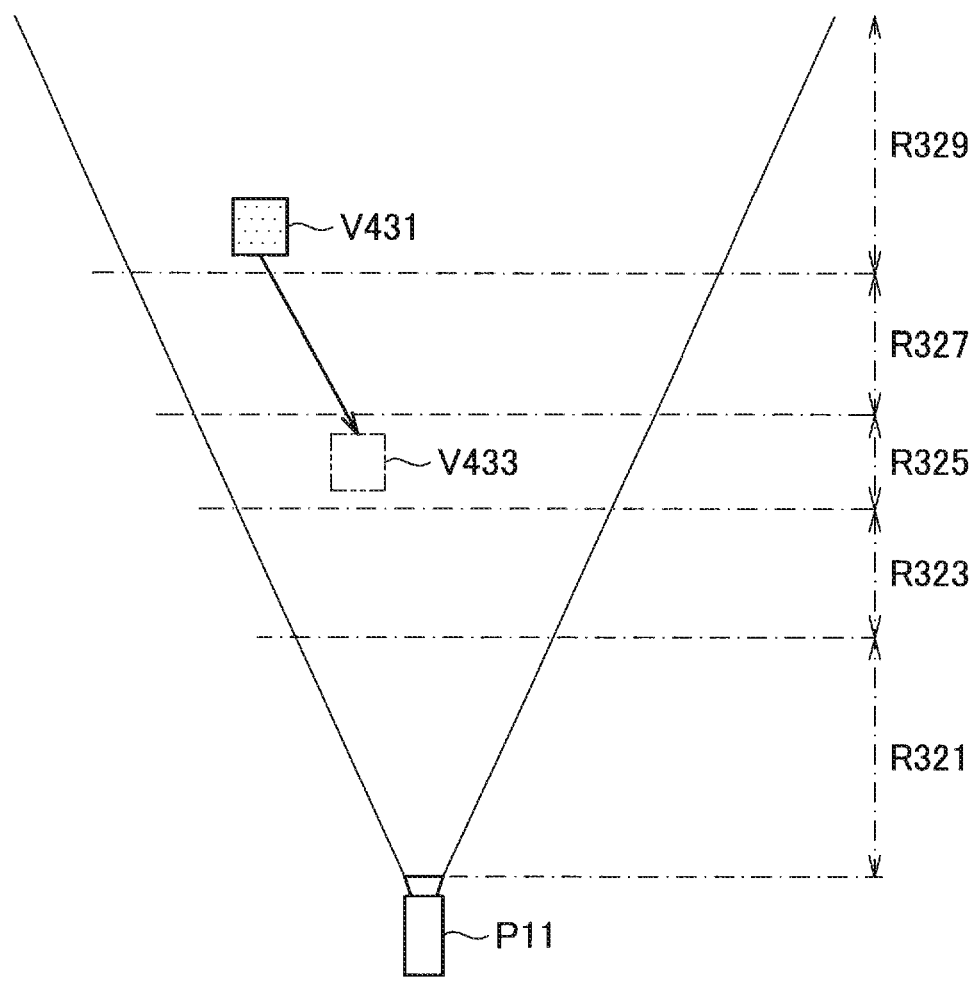
FIG. 12 is an explanatory diagram for explaining an overview of another mode of the information processing system according to Modification 2.

For example, in the example illustrated in FIG. 12, a case in which the position illustrated by the reference sign V433 is predicted as the movement destination of a virtual object V431 is assumed, and the region corresponding to the field of view taking the viewpoint P11 as the point of origin is divided into multiple regions R321 to R329 along the depth direction. More specifically, in the example illustrated in FIG. 12, the width in the depth direction of the region R325 that includes the position V433 predicted as the movement destination of the virtual object V431, and of the regions R323 and R327 adjacent to the region R325, are set narrower than the other regions R321 and R329. Note that mutually different buffers are associated with each of the regions R321 to R329.

According to such a configuration, in the case in which the viewpoint P11 moves, the information processing system becomes able to execute correction more accurately, accounting for changes in the positional relationship between the virtual object V431 and other real objects and virtual objects due to the movement of the virtual object V431.

Note that the correction utilizing a prediction result is not limited to only a method of utilizing a result of predicting the motion of a virtual object as illustrated in FIG. 12. As a specific example, the information processing system may predict changes in the position and direction of the viewpoint on the basis of a result of detecting changes in the position and attitude of the user's head, and thereby, on the basis of the prediction result, divide a region in the real space into multiple regions into multiple regions. Also, as another example, under conditions in which a real object is moving, the information processing system may predict the movement destination of the real object, and on the basis of the prediction result, divide a region in the real space into multiple regions into multiple regions.

Also, the examples described above are merely examples, and the method of dividing a region in a real space into multiple regions is not necessarily limited to the examples described above. For example, a region in a real space preferably is divided into multiple regions according to a target that should be presented with higher priority (that is, a target whose display position is corrected more finely). As a more specific example, by setting the target that should be prioritized for presentation for each use case and usage scenario of the information processing system, a region in a real space may be divided into multiple regions according to the use case or usage scenario.

The above describes, as Modification 2, an example of a method of dividing a region in a real space (that is, a region corresponding to the field of view taking the viewpoint as the point of origin) into multiple regions.

<4.3. Modification 3: Buffer Control Examples>

Next, examples of controlling buffers will be described as Modification 3.

For example, the information processing system may control the number of buffers to assign for drawing virtual objects and a depth map dynamically according to various states and conditions.

For example, in Modification 2, an example of dividing a region in a real space into multiple regions dynamically according to a condition is described, but at this time, the information processing system may also change the number of divided regions dynamically. In this case, since the number of buffers associated with each of the divided regions varies according to the number of divided regions, the information processing system may also control the number of buffers in which to draw virtual objects according to the number of divided regions.

Also, as another example, in the case of associating buffers with virtual objects directly as illustrated in Modification 1, the information processing system may also control the number of buffers in which to draw virtual objects according to the number of virtual objects to be presented.

Note that in the case in which the number of buffers is insufficient as a result of dynamically changing the association of buffers with respect to the region in the real space and the virtual objects, the information processing system may also newly allocate buffers from a predetermined storage area. Also, in the case of reaching a situation in which some buffers are not used as a result of dynamically changing the association of buffers with respect to the region in the real space and the virtual objects, the information processing system may also release the storage area from which the buffers were allocated.

Also, even in the case of dividing a region in a real space into multiple regions, it is not necessarily the case that a virtual object will be superimposed onto all divided regions.

In such cases, a virtual object may not be drawn in a buffer associated with a region where a virtual object is not superimposed in some cases. In light of such conditions, for example, the information processing system may also release the association of a buffer for a region where a virtual object is not superimposed. In this case, the information processing system may also release the storage area from which the buffer whose association with a region was released was allocated.

Also, cases in which the information processing system temporarily suppresses the display of (that is, hides) a virtual object depending on conditions may also be anticipated. In such cases, during the period of suppressing the display of virtual objects, the information processing system may suppress the drawing itself of the virtual object by releasing the association of a buffer with the region where the virtual object was being superimposed, or release the storage area from which the buffer was allocated. Note that in the case of re-displaying a virtual object whose display had been suppressed, it is sufficient for the information processing system to again associate a buffer with the region where the virtual object is to be presented. Also, at this time, the information processing system may also re-allocate a buffer to associate with the region.

Also, the information processing system may limit the use of some buffers by dynamically limiting the drawing of some virtual objects. As a specific example, according to various states and conditions, the information processing system may treat a virtual object presented farther in the back as an object that the user is not focusing on, and limit the drawing of the virtual object. Also, as another example, according to various states and conditions, the information processing system may treat a virtual object more distant from a position that the user is focusing on as an object that the user is not focusing on, and limit the drawing of the virtual object. Note that for a buffer whose use is limited in association with the limiting of drawing, the information processing system may also use the buffer for another purpose, such as using the buffer to draw another virtual object or the like.

Also, as described above, the correction of the display positions of virtual objects is executed in units of buffers. For this reason, for example, under conditions in which multiple virtual objects are superimposed onto a partial region, for example, the information processing system may divide the region again even more finely, and associate buffers individually with each of the divided regions. By such control, the information processing system becomes able to correct the display position of each of the multiple virtual objects individually.

Also, as another example, the information processing system may control the size of at least some buffers among each of the buffers in which virtual objects and the depth map are drawn.

Figure 13:
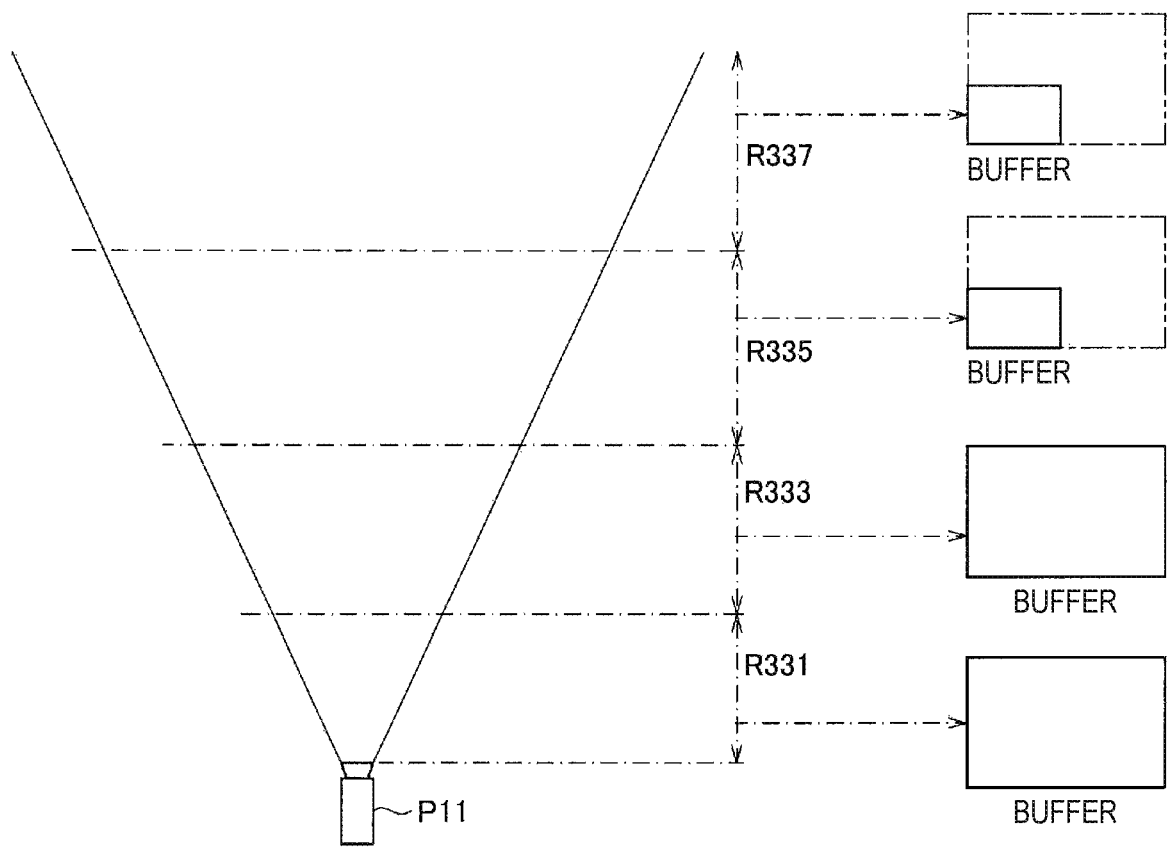
FIG. 13 is an explanatory diagram for explaining an overview of one mode of the information processing system according to Modification 3.

As a specific example, by setting priorities among buffers, the information processing system may allocate the buffers with a size corresponding to the priority. For example, FIG. 13 is an explanatory diagram for explaining an overview of one mode of the information processing system according to Modification 3, and illustrates an example of buffer size control.

Generally, there is a tendency whereby a virtual object positioned farther away is presented smaller, and the resolution of the virtual object is also lower relatively. For this reason, in the example illustrated in FIG. 13, the information processing system sets the size of the buffers to associate with the multiple regions R331 to R337 obtained by dividing the region corresponding to the field of view taking the viewpoint P11 as the point of origin along the depth direction according to the position in the depth direction of the region. Specifically, in the example illustrated in FIG. 13, the information processing system sets the priorities of the regions R331 and R333 positioned farther in the front higher than the priorities of the regions R335 and R337 positioned farther in the back, and sets the sizes of the buffers to associate according to the priorities. In other words, the information processing system sets the sizes of the buffers associated with the regions R335 and R337 smaller than the sizes of the buffers associated with the regions R331 and R333. Note that for a virtual object drawn in a buffer of small size, when synthesized with virtual objects drawn in another buffer, the information processing system preferably executes the synthesis after first performing an enlargement process to match the size of the virtual object drawn in the other buffer.

As described above, by limiting the size of some of the buffers, for example, it also becomes possible to reduce the processing load related to the drawing of virtual objects. Note that the control of the sizes of buffers described above may also be executed dynamically according to various states and conditions.

In addition, to limit the sizes of some of the buffers, the information processing system may also switch the operations related to the drawing of a virtual object and the operations related to the output of the virtual object. For example, FIG. 14 is an explanatory diagram for explaining an overview of one mode of the information processing system according to Modification 3, and illustrates an example of a mechanism for limiting the size of a buffer.

Specifically, as described above, there is a tendency whereby a virtual object positioned farther away is presented smaller, and the resolution is also lower relatively, such that even if the display of the virtual object is changed slightly, the user has difficulty recognizing the change in the display in some cases. Accordingly, in the example illustrated in FIG. 14, for a virtual object presented farther away, by drawing images to present according to the positional relationship with the viewpoint in advance, and switching these images, the information processing system limits the size of the buffer for the drawing.

Figure 14:
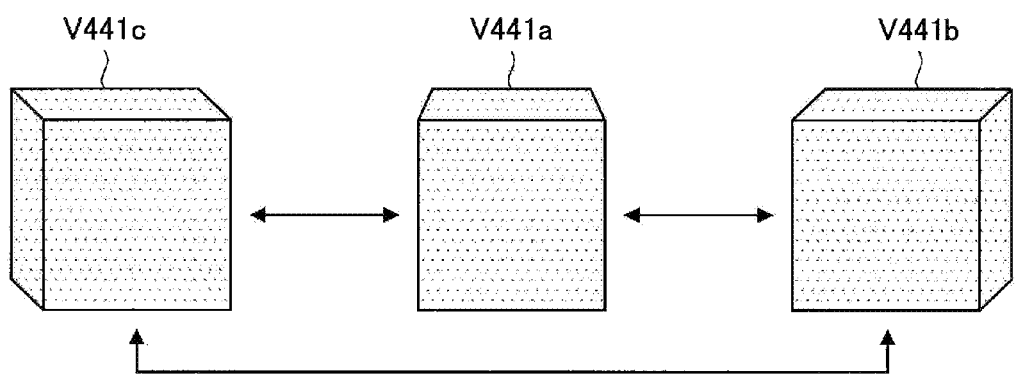
FIG. 14 is an explanatory diagram for explaining an overview of one mode of the information processing system according to Modification 3.

Specifically, in the example illustrated in FIG. 14, for a virtual object to be presented, images V441a to V441c of the virtual object in the case of looking from mutually different directions are drawn in advance. In other words, the image V441a is an image in the case of referencing the virtual object from the front. Also, the image V441b is an image in the case of referencing the virtual object from the right side with respect to the front, and the image V441b is an image in the case of referencing the virtual object from the left side with respect to the front. Additionally, in accordance with the positional relationship between the position where the virtual object is superimposed and the viewpoint, the information processing system presents one of the images V441a to V441c as the image of the virtual object. By taking such a configuration, it becomes possible to limit the size of the buffer compared to the case of drawing a virtual object presented three-dimensionally, and furthermore, it also becomes possible to reduce the processing load related to the drawing.

In addition, the information processing system may also set priorities among the buffers, and in accordance with the priorities, limit processes related to the correction of the display position for virtual objects drawn in some of the buffers. For example, by setting a higher priority for a buffer associated with a region positioned closer to a position that the user is focusing on, the information processing system may limit processes related to the correction of the display position for a virtual object superimposed onto a position distant from the position that the user is focusing on. By such a configuration, the information processing system becomes able to reduce the processing load when synthesizing the virtual objects drawn in each of the buffers.

Also, regarding conditions by which the information processing system dynamically limits the number and sizes of the buffers, for example, it is sufficient to set the conditions according to the use case and usage scenario of the information processing system. As a specific example, under conditions in which the amount of usable power is limited (such as when battery-driven, for example), the information processing system may reduce power consumption by limiting the number and sizes of buffers, and reducing the processing load related to the drawing and synthesis of virtual objects.

The above describes, as Modification 3, examples of controlling buffers.

<4.4. Modification 4: Example of Control Related to Drawing and Output of Virtual Objects>

Next, an example of control related to the drawing of virtual objects to each buffer and the output of the virtual objects will be described as Modification 4.

(Example Control of Drawing and Output of Virtual Object Presented in the Distance)

First, an example of the case of controlling the drawing and output of a virtual object presented in the distance will be described. As described earlier, for a virtual object positioned farther away, even if the display is changed slightly, the user has difficulty recognizing the change in the display in some cases. Accordingly, for example, for a series of virtual objects presented in a region farther away from the position of the viewpoint, the information processing system may draw the virtual objects as a two-dimensional image without executing three-dimensional drawing individually, and thereby reduce the processing load related to the drawing. In this case, it is sufficient for the information processing system to control the display position of the two-dimensional image in which the series of virtual objects superimposed onto a region is drawn according to the positional relationship between the target region and the viewpoint, on the basis of technology such as what is called a cubemap or parallax.

(Example of Control in the Case of Fixing Display Position)

Next, an example of the case of controlling the drawing and output of information whose display position is fixed, such as What is called a UI or the like, will be described. For display information presented independently without making an association with the real space, like a UI or the like, the display information is expected to be presented always in the same position, even in the case in which the position and direction of the viewpoint change. In other words, for display information such as a UI, for example, even in the case in which the position and direction of the viewpoint change, correction of the display position is unnecessary in some cases. In light of such conditions, for example, the information processing system may provide a buffer for drawing a series of display information excluded from the target of the correction.

(Control of Timing of Processes Related to Drawing and Synthesis)

Next, an example of a case of controlling the timing of processes related to drawing and synthesis will be described. The process related to the drawing of virtual objects and the process related to the synthesis of virtual objects drawn in each buffer tend to have a comparatively high processing load, and the processing time in association with the processing load becomes long in some cases. In light of such conditions, the information processing system may also detect a timing at which the user is not looking at a virtual object, and execute the processes with a high processing load described above at the timing.

As a specific example, by predicting the tinting at which the user blinks, the information processing system may execute control with a high processing load to match the timing at which the user closes one's eyes, on the basis of the prediction result. Also, at this time, the information processing system may also correct the display position of virtual objects drawn in each buffer and control the tinting at which to synthesize the virtual objects to match the timing at which the user opens one's eyes.

Note that as long as it is possible to predict the timing at which the user blinks, the method is not particularly limited. As a specific example, the information processing system may monitor user behavior, and predict the timing at which the user will blink according to a result of comparing the monitoring result to the characteristics of the user behavior.

The above describes, as Modification 4, an example of control related to the drawing of virtual objects to each buffer and the output of the virtual objects.

<4.5. Modification 5: Example of Interaction Control>

Next, an example of the control of interactions in the information processing system according to the present embodiment will be described as Modification 5.

(Combination with Other Output Information)

First, an example of control that further alleviates the impact of the delay associated with the drawing of virtual objects by combining with control of other output information will be described. For example, when presenting a virtual object, by controlling the output of sound such that the sound arrives from the position where the virtual object is presented, a situation in which sound is being output from the virtual object is simulated in some cases. In such cases, by controlling the output of sound according to the positional relationship between the viewpoint, each virtual object to be presented, and a real object positioned in the real space, the information processing system may alleviate the impact of the delay associated with the drawing of virtual objects.

As a more specific example, a situation in which another virtual object or real object is interposed between the viewpoint and a virtual object simulating a state of outputting sound will be focused on. In such a situation, for example, by controlling the volume and tone quality of the sound, the information processing system may simulate a situation in which the sound output from the virtual object is being masked by the other virtual object or real object. By such control, even in a case in which the correction of the display position of a virtual object is imperfect, it becomes possible to interpolate the imperfection.

(Display Mode Control Example)

Next, an example of control of the display mode of a virtual object and the advantageous effects anticipated by the control will be described. For example, the information processing system may control the display of virtual objects to raise the transmittance (for example, present as translucent) of another virtual object superimposed onto another region other than the region onto which a virtual object that the user is focusing on is superimposed. By such control, the virtual object that the user is focusing on is emphasized more, making it possible to present the positional relationship with another virtual object (particularly the positional relationship in the depth direction) in a more easily understood way.

Also, by presenting some virtual object or objects with more emphasis, it also becomes possible to guide the user's line of site with the virtual object or objects. By utilizing such control, for example, the information processing system may also control the division of a region in the real space and the association of buffers with respect to the region to enable finer control of the display position of a virtual object near the position to which the user's line of sight is guided.

The above describes, as Modification 5, an example of the control of interactions in the information processing system according to the present embodiment.

<<5. Hardware Configuration>>

Next, a hardware configuration of an information processing apparatus 900 included in the information processing system 1 according to the present embodiment, like the information processing apparatus 10 and the input/output apparatus 20 described above, will be described in detail with reference to FIG. 15. FIG. 15 is a function block diagram illustrating an exemplary configuration of the hardware configuration of the information processing apparatus 900 included in the information processing system 1 according to an embodiment of the present disclosure.

The information processing apparatus 900 included in the information processing system 1 according to the present embodiment primarily is provided with a CPU 901, ROM 903, and RAM 905. Also, the information processing apparatus 900 additionally is provided with a host bus 907, a bridge 909, an external bus 911, an interface 913, an input apparatus 915, an output apparatus 917, a storage apparatus 919, a drive 921, a connection port 923, and a communication apparatus 925.

The CPU 901 functions as a computational processing apparatus and control apparatus, and controls all or part of the operations in the information processing apparatus 900 by following various programs recorded in the ROM 903, the RAM 905, the storage apparatus 919, or a removable recording medium 927. The ROM 903 stores programs, computational parameters, and the like used by the CPU 901. The RAM 905 temporarily stores programs used by the CPU 901, parameters that change as appropriate during the execution of the programs, and the like. These are interconnected by the host bus 907, which includes an internal bus such as a CPU bus. Note that the recognition unit 101, the drawing unit 103, the display control unit 107, and the buffer control unit 111 described above with reference to FIG. 7 may be realized by the CPU 901, for example.

The host bus 907 is connected to the external bus 911 such as a Peripheral Component Interconnect/Interface (PCI) bus via the bridge 909. Also, the input apparatus 915, the output apparatus 917, the storage apparatus 919, the drive 921, the connection port 923, and the communication apparatus 925 are connected to the external bus 911 via the interface 913.

The input apparatus 915 is a user-operated operating means, such as a mouse, a keyboard, a touch panel, a button, a switch, or a lever, for example. Also, for example, the input apparatus 915 may be a remote control means (also referred to as a remote) utilizing infrared or some other electromagnetic wave, and may also be an external connection device 929 such as a mobile phone or PDA supporting operation of the information processing apparatus 900. Furthermore, for example, the input apparatus 915 includes an input control circuit or the like that generates an input signal on the basis of information input by the user using the above operating means, and outputs the generated input signal to the CPU 901. By operating the input apparatus 915, the user of the information processing apparatus 900 is able to input various data and instruct the information processing apparatus 900 to perform processing operations.

The output apparatus 917 is an apparatus capable of visually or aurally notifying the user of acquired information. Such an apparatus may be a display apparatus, such as a CRT display apparatus, a liquid crystal display apparatus, a plasma display apparatus, an EL display apparatus, indicator lights, and the like, an audio output apparatus such as a speaker or headphones, a printer apparatus, or the like. For example, the output apparatus 917 outputs results obtained by various processes executed by the information processing apparatus 900. Specifically, a display apparatus displays results obtained by various processes executed by the information processing apparatus 900 as text or images. On the other hand, an audio output apparatus outputs an analog signal converted from an audio signal containing played-back speech data, sound data, or the like. Note that the output unit 211 described above with reference to FIG. 7 may be realized by the output apparatus 917, for example.

The storage apparatus 919 is an apparatus used for data storage, configured as an example of a storage unit in the information processing apparatus 900. For example, the storage apparatus 919 includes a magnetic storage device such as a hard disk drive (HDD), a semiconductor storage device, an optical storage device, a magneto-optical storage device, or the like. The storage apparatus 919 stores programs executed by the CPU 901, various data, and the like.

The drive 921 is a reader/writer for a recording medium, and is built into or externally attached to the information processing apparatus 900. The drive 921 reads out information recorded onto the removable recording medium 927 such as an inserted magnetic disk, optical disc, magneto-optical disc, or semiconductor memory, and outputs the information to the RAM 905. Also, the drive 921 is capable of writing records to the removable recording medium 927 such as an inserted magnetic disk, optical disc, magneto-optical disc, or semiconductor memory. The removable recording medium 927 is MD media, HD-DVD media, Blu-ray® media, or the like for example. Also, the removable recording medium 927 may be CompactFlash® (CF), flash memory, a Secure Digital (SD) memory card, or the like. Also, for example, the removable recording medium 927 may be an integrated circuit (IC) card or an electronic device in which a contactless IC chip is mounted, or the like. Note that the buffers 105 and the temporary buffer 109 described above with reference to FIG. 7 may be realized by at least one of the RAM 905 and the storage apparatus 919, for example.

The connection port 923 is a port for connecting directly to the information processing apparatus 900. Examples of the connection port 923 include a Universal Serial Bus (USB) port, an IEEE 1394 port, a Small Computer System Interface (SCSI) port, and the like. Other examples of the connection port 923 include an RS-232C port, an optical audio socket, a High-Definition Multimedia Interface (HDMI®) port, and the like. By connecting the external connection device 929 to the connection port 923, the information processing apparatus 900 acquires various data directly from the external connection device 929, and provides various data to the external connection device 929.

The communication apparatus 925 is, for example, a communication interface including a communication device for connecting to a communications net (network) 931. For example, the communication apparatus 925 is a communication card for a wired or wireless local area network (LAN), Bluetooth®, or Wireless USB (WUSB), or the like. Also, the communication apparatus 925 may be an optical communication router, an asymmetric digital subscriber line (ADSL) router, a modem for any of various types of communication, or the like. For example, the communication apparatus 925 is able to transmit and receive signals and the like to and from the Internet or another communication device in accordance with a predetermined protocol such as TCP/IP, for example. Also, the communications net 931 connected to the communication apparatus 925 may include a network or the like connected in a wired or wireless manner, and for example, may be the Internet, a home LAN, infrared communication, radio-wave communication, satellite communication, or the like.

The above illustrates an example of a hardware configuration capable of achieving the functions of the information processing apparatus 900 included in the information processing system 1 according to an embodiment of the present disclosure. Each of the above structural elements may be configured using general-purpose members, but may also be configured by hardware specialized in the function of each structural element. Consequently, it is possible to appropriately modify the hardware configuration to be used according to the technological level at the time of carrying out the present embodiment. Note that, although not illustrated in FIG. 15, various types of configurations corresponding to the information processing apparatus 900 included in the information processing system 1 according to the present embodiment obviously are provided.

Note that it is also possible to develop a computer program for realizing each function of the information processing apparatus 900 included in the information processing system 1 according to the present embodiment as described above, and implement the computer program in a personal computer or the like. Also, a computer-readable recording medium storing such a computer program may also be provided. The recording medium is, for example, a magnetic disk, an optical disc, a magneto-optical disc, flash memory, or the like. Also, the above computer program may be delivered via a network, for example, without using a recording medium. Also, the number of computers made to execute the computer program is not particularly limited. For example, the computer program may be executed by multiple computers (such as multiple servers, for example) linked to each other. Note that a single computer or a linkage of multiple computers is also called a "computer system".

<<6. Conclusion>>

As described above, the information processing system according to the present embodiment directly or indirectly associates each of multiple pieces of display information (for example, virtual objects) with any of multiple buffers, and in each buffer, draws the display information associated with the buffer. Additionally, on the basis of a result of recognizing a real object in a real space, the information processing system corrects the display of the display information drawn in each of the multiple buffers, and causes a predetermined output unit to present each piece of corrected display information according to the positional relationship with the real object. By such a configuration, the information processing system according to the present embodiment becomes able to correct the display of the display information individually according to the positional relationship between the viewpoint, each piece of display information, and the real object. In other words, the information processing system according to the present embodiment becomes able to individually correct the impact associated with the drawing delay according to the position where the display information is superimposed, and in addition, control the display (for example, the display position) of each piece of display information while accounting for the masking by the real object.

Note that although the above description primarily focuses on the case in which the input/output apparatus 20 is configured as an HMD, as long as AR is achievable, the configuration of the input/output apparatus 20 is not necessarily limited to an HMD. As a specific example, an information processing apparatus such as a smartphone or the like may also be applied as the input/output apparatus 20. In this case, for example, it is sufficient to superimpose a virtual object onto an image of an external scene on the basis of a mechanism similar to a see-through HMD.

Also, an imaging unit may also be provided separately as an external apparatus different from the input/output apparatus 20. In this way, by providing the imaging unit separately, it becomes possible to capture a physical object (subject) in the real space from a variety of directions, thereby making it possible to further improve the accuracy of the generated depth map.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an acquisition unit that acquires information related to a result of recognizing a real object in a real space;

a drawing unit that draws, in each of a plurality of buffers, display information directly or indirectly associated with the buffer from among a plurality of pieces of display information; and a display control unit that corrects a display of the display information drawn in each of the plurality of buffers on a basis of the result of recognizing the real object, and causes a predetermined output unit to present each piece of the display information whose display has been corrected according to a positional relationship with the real object.

(2)

The information processing apparatus according to (1), including:

a buffer control unit that directly or indirectly associates each of the plurality of pieces of display information with any of the plurality of buffers.

(3)

The information processing apparatus according to (2), in which the display control unit corrects a display position of the display information drawn in each of the plurality of buffers on a basis of a positional relationship between the real object and a viewpoint according to the result of recognizing the real object.

(4)

The information processing apparatus according to (3), in which the buffer control unit associates mutually different buffers with each of a plurality of regions along a depth direction of a real space taking a position of the viewpoint as a point of origin, the drawing unit draws the display information to present positioned in each of the plurality of regions in the buffer associated with the region, and the display control unit targets at least one of the plurality of buffers, and corrects the display position of the display information to present in the region associated with the targeted buffer according to a positional relationship between the region and the viewpoint.

(5)

The information processing apparatus according to (3), in which the buffer control unit associates each of the plurality of pieces of display information with mutually different buffers, and the display control unit targets at least one of the plurality of buffers, and corrects the display position of the display information associated with the targeted buffer according to a positional relationship between the display information and the viewpoint.

(6)

The information processing apparatus according to any one of (2) to (5), in which the buffer control unit directly or indirectly associates each of the plurality of pieces of display information with any of the plurality of buffers according to a predetermined state or condition.

(7)

The information processing apparatus according to (6), in which the buffer control unit controls a number of the buffers according to a predetermined state or condition.

(8)

The information processing apparatus according to (6) or (7), in which the buffer control unit controls a size of at least one of the plurality of buffers according to a predetermined state or condition.

(9)

The information processing apparatus according to any one of (6) to (8), in which the buffer control unit controls a direct or indirect association between the plurality of pieces of display information and the plurality of buffers according to a predetermined state or condition.

(10)

The information processing apparatus according to (9), in which the buffer control unit controls a direct or indirect association between the plurality of pieces of display information and the plurality of buffers according to a position in a real space indicated by a line of sight of a user.

(11)

The information processing apparatus according to (9), in which the buffer control unit controls a direct or indirect association between the plurality of pieces of display information and the plurality of buffers according to a result of predicting a change in a line of sight of a user.

(12)

The information processing apparatus according to (9), in which the buffer control unit controls a direct or indirect association between the plurality of pieces of display information and the plurality of buffers according to a result of predicting a motion of at least one piece of display information among the plurality of pieces of display information.

(13)

The information processing apparatus according to any one of (1) to (11), in which the display control unit controls a presentation to the output unit of the display information drawn in each of the plurality of buffers on a basis of a priority set among the plurality of buffers.

(14)

The information processing apparatus according to (13), in which the display control unit corrects a display of the display information drawn in at least one of the plurality of buffers according to the priority set for the buffer.

(15)

The information processing apparatus according to (13) or (14), in which the drawing unit limits a drawing of the display information in at least one of the plurality of buffers according to the priority set for the buffer.

(16)

The information processing apparatus according to any one of (1) to (15), in which the display control unit excludes some buffer or buffers among the plurality of buffers from a target of the correction.

(17)

The information processing apparatus according to any one of (1) to (16), in which the display control unit, on a basis of a result of recognizing the real object acquired at a timing after a timing at which the display information is drawn in the buffer, corrects a display of the display information drawn in the buffer.

(18)

An information processing method including, by a computer system:

acquiring information related to a result of recognizing a real object in a real space;

drawing, in each of a plurality of buffers, display information directly or indirectly associated with the buffer from among a plurality of pieces of display information; and correcting a display of the display information drawn in each of the plurality of buffers on a basis of the result of recognizing the real object, and causing a predetermined output unit to present each piece of the display information whose display has been corrected according to a positional relationship with the real object.

(19)

A program causing a computer system to execute:

acquiring information related to a result of recognizing a real object in a real space;

drawing, in each of a plurality of buffers, display information directly or indirectly associated with the buffer from among a plurality of pieces of display information; and correcting a display of the display information drawn in each of the plurality of buffers on a basis of the result of recognizing the real object, and causing a predetermined output unit to present each piece of the display information whose display has been corrected according to a positional relationship with the real object.

REFERENCE SIGNS LIST 1 information processing system
10 information processing apparatus
101 recognition unit
103 drawing unit
105 buffer
107 display control unit
109 temporary buffer
111 buffer control unit
20 input/output apparatus
201 imaging unit
211 output unit
251 detection unit

The invention claimed is:

1. An information processing apparatus comprising:
an acquisition unit that acquires information related to a result of recognizing a real object in a real space;
a drawing unit that draws, in each buffer of a plurality of buffers, display information directly or indirectly associated with the buffer from among a plurality of pieces of display information; and
a display control unit that corrects a display of the display information drawn in each buffer of the plurality of buffers on a basis of the result of recognizing the real object, and causes a predetermined output unit to present each piece of the display information whose display has been corrected according to a positional relationship with the real object,
wherein the drawing unit draws each piece of the display information in a corresponding buffer of the plurality of buffers, the corresponding buffer being determined according to a position of the piece of the display information along a depth direction with respect to a viewpoint of a user,
wherein the drawing unit draws each piece of display information in the corresponding buffer determined based on a result of comparing the position of the piece of the display information in the depth direction with at least one threshold distance, and
wherein the acquisition unit, the drawing unit, and the display control unit are each implemented via at least one processor.

2. The information processing apparatus according to claim 1, further comprising:
a buffer control unit that directly or indirectly associates each piece of display information of the plurality of pieces of display information with any buffer of the plurality of buffers,
wherein the buffer control unit is implemented via at least one processor.

3. The information processing apparatus according to claim 2, wherein
the display control unit corrects a display position of the display information drawn in each buffer of the plurality of buffers on a basis of a positional relationship between the real object and the viewpoint according to the result of recognizing the real object.

4. The information processing apparatus according to claim 3, wherein
the buffer control unit associates mutually different buffers with each region of a plurality of regions along the depth direction of the real space taking a position of the viewpoint as a point of origin,
the drawing unit draws the display information to present positioned in each region of the plurality of regions in the buffer associated with the region, and
the display control unit targets at least one of the plurality of buffers, and corrects the display position of the display information to present in the region associated with each targeted buffer according to a positional relationship between the region and the viewpoint.

5. The information processing apparatus according to claim 3, wherein
the buffer control unit associates each of the plurality of pieces of display information with mutually different buffers, and
the display control unit targets at least one of the plurality of buffers, and corrects the display position of the display information associated with each targeted buffer according to a positional relationship between the display information and the viewpoint.

6. The information processing apparatus according to claim 2, wherein
the buffer control unit directly or indirectly associates each of the plurality of pieces of display information with any of the plurality of buffers according to a predetermined state or condition.

7. The information processing apparatus according to claim 6, wherein
the buffer control unit controls a number of the buffers according to a predetermined state or condition.

8. The information processing apparatus according to claim 6, wherein
the buffer control unit controls a size of at least one of the plurality of buffers according to a predetermined state or condition.

9. The information processing apparatus according to claim 6, wherein
the buffer control unit controls a direct or indirect association between the plurality of pieces of display information and the plurality of buffers according to a predetermined state or condition.

10. The information processing apparatus according to claim 9, wherein
the buffer control unit controls a direct or indirect association between the plurality of pieces of display information and the plurality of buffers according to a position in the real space indicated by a line of sight of the user.

11. The information processing apparatus according to claim 9, wherein
the buffer control unit controls a direct or indirect association between the plurality of pieces of display information and the plurality of buffers according to a result of predicting a change in a line of sight of the user.

12. The information processing apparatus according to claim 9, wherein
the buffer control unit controls a direct or indirect association between the plurality of pieces of display information and the plurality of buffers according to a result of predicting a motion of at least one piece of display information among the plurality of pieces of display information.

13. The information processing apparatus according to claim 1, wherein
the display control unit controls a presentation to the output unit of the display information drawn in each of the plurality of buffers on a basis of a priority set among the plurality of buffers.

14. The information processing apparatus according to claim 13, wherein
the display control unit corrects a display of the display information drawn in at least one of the plurality of buffers according to the priority set for the buffer.

15. The information processing apparatus according to claim 13, wherein
the drawing unit limits a drawing of the display information in at least one of the plurality of buffers according to the priority set for the buffer.

16. The information processing apparatus according to claim 1, wherein
the display control unit excludes one or more buffers among the plurality of buffers from a target of the correction.

17. The information processing apparatus according to claim 1, wherein
the display control unit, based on the result of recognizing the real object acquired at a timing after the display information is drawn in the buffer, corrects the display of the display information drawn in the buffer.

18. The information processing apparatus according to claim 1,
wherein the plurality of buffers includes at least three buffers, and
wherein drawing unit draws each piece of the display information in the corresponding buffer determined based on a result of comparing the position of the piece of the display information in the depth direction with at least two threshold distances.

19. An information processing method comprising, by a computer system:
acquiring information related to a result of recognizing a real object in a real space;
drawing, in each buffer of a plurality of buffers, display information directly or indirectly associated with the buffer from among a plurality of pieces of display information; and
correcting a display of the display information drawn in each buffer of the plurality of buffers on a basis of the result of recognizing the real object, and causing a predetermined output unit to present each piece of the display information whose display has been corrected according to a positional relationship with the real object,
wherein each piece of the display information is drawn in a corresponding buffer of the plurality of buffers, the corresponding buffer being determined according to a position of the piece of the display information along a depth direction with respect to a viewpoint of a user, and
wherein each piece of display information is drawn in the corresponding buffer determined based on a result of comparing the position of the piece of the display information in the depth direction with at least one threshold distance.

20. A non-transitory computer-readable medium having embodied thereon a program, which when executed by a computer system causes the computer system to execute a method, the method comprising:
acquiring information related to a result of recognizing a real object in a real space;
drawing, in each buffer of a plurality of buffers, display information directly or indirectly associated with the buffer from among a plurality of pieces of display information; and
correcting a display of the display information drawn in each buffer of the plurality of buffers on a basis of the result of recognizing the real object, and causing a predetermined output unit to present each piece of the display information whose display has been corrected according to a positional relationship with the real object,
wherein each piece of the display information is drawn in a corresponding buffer of the plurality of buffers, the corresponding buffer being determined according to a position of the piece of the display information along a depth direction with respect to a viewpoint of a user, and
wherein each piece of display information is drawn in the corresponding buffer determined based on a result of comparing the position of the piece of the display information in the depth direction with at least one threshold distance.

* * * * *